(12) United States Patent
Khalilian-Gourtani et al.

(10) Patent No.: US 12,327,392 B2
(45) Date of Patent: Jun. 10, 2025

(54) USER-GUIDED IMAGE SEGMENTATION METHODS AND PRODUCTS

(71) Applicant: Dolby Laboratories Licensing Corporation, San Francisco, CA (US)

(72) Inventors: Amirhossein Khalilian-Gourtani, New York, CA (US); Neeraj J. Gadgil, Pune (IN); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 483 days.

(21) Appl. No.: 17/780,279

(22) PCT Filed: Dec. 2, 2020

(86) PCT No.: PCT/US2020/062942
§ 371 (c)(1),
(2) Date: May 26, 2022

(87) PCT Pub. No.: WO2021/113400
PCT Pub. Date: Jun. 10, 2021

(65) Prior Publication Data
US 2023/0005243 A1    Jan. 5, 2023

Related U.S. Application Data

(60) Provisional application No. 62/944,847, filed on Dec. 6, 2019.

(30) Foreign Application Priority Data

Dec. 6, 2019    (EP) ..................................... 19214123

(51) Int. Cl.
G06V 10/762    (2022.01)
G06F 18/23    (2023.01)
(Continued)

(52) U.S. Cl.
CPC .......... *G06V 10/7635* (2022.01); *G06F 18/23* (2023.01); *G06F 18/23213* (2023.01);
(Continued)

(58) Field of Classification Search
None
See application file for complete search history.

(56) References Cited

U.S. PATENT DOCUMENTS 6,034,690 A    3/2000 Gallery
7,257,273 B2    8/2007 Li
(Continued)

FOREIGN PATENT DOCUMENTS

KR    101631953 B1    6/2016
WO    2010024782 A1    3/2010

OTHER PUBLICATIONS

Bo Peng et al: Image segmentation by iterated region merging with localized graph cuts Pattern Recognition, vol. 44, No. 10-11, Oct. 1, 2011, pp. 2527-2538.

(Continued)

*Primary Examiner* — Emily C Terrell
*Assistant Examiner* — Nathan J Bloom

(57) ABSTRACT

A method for image segmentation includes (a) clustering, based upon k-means clustering, pixels of an image into first clusters, (b) outputting a cluster map of the first clusters (c) re-clustering the pixels into a new plurality of non-disjoint pixel-clusters, and (d) classifying the non-disjoint pixel-clusters in categories, according to a user-indicated classification. Another method for image segmentation includes (a) forming a graph with each node of the graph corresponding to a first respective non-disjoint pixel-cluster of the image and connected to each terminal of the graph and to all other nodes corresponding to other respective non-disjoint pixel-clusters that, in the image, are within a neighborhood (Continued)

of the first respective non-disjoint pixel-cluster, (b) setting weights of connections of the graph according to a user-indicated classification in categories respectively associated with the terminals, and (c) segmenting the image into the categories by cutting the graph based upon the weights.

26 Claims, 16 Drawing Sheets

(51) Int. Cl.
  *G06F 18/23213*    (2023.01)
  *G06F 18/2323*    (2023.01)
  *G06F 18/40*    (2023.01)
  *G06T 5/30*    (2006.01)
  *G06T 7/11*    (2017.01)
  *G06T 7/155*    (2017.01)
  *G06T 7/90*    (2017.01)
  *G06V 10/26*    (2022.01)
  *G06V 10/28*    (2022.01)
  *G06V 10/34*    (2022.01)
  *G06V 10/44*    (2022.01)
  *G06V 10/56*    (2022.01)
  *G06V 10/764*    (2022.01)

(52) U.S. Cl.
  CPC .......... *G06F 18/2323* (2023.01); *G06F 18/40* (2023.01); *G06T 5/30* (2013.01); *G06T 7/11* (2017.01); *G06T 7/155* (2017.01); *G06T 7/90* (2017.01); *G06V 10/26* (2022.01); *G06V 10/28* (2022.01); *G06V 10/34* (2022.01); *G06V 10/44* (2022.01); *G06V 10/56* (2022.01); *G06V 10/763* (2022.01); *G06V 10/764* (2022.01); *G06T 2200/24* (2013.01); *G06T 2207/10016* (2013.01); *G06T 2207/20044* (2013.01); *G06T 2207/20072* (2013.01)

(56) References Cited

U.S. PATENT DOCUMENTS

| | | | |
|---|---|---|---|
| 8,335,390 B2 | 12/2012 | Li | |
| 8,570,426 B2 | 10/2013 | Pitts | |
| 8,780,996 B2 | 7/2014 | Bankoski | |
| 8,823,745 B2 | 9/2014 | Francois | |
| 8,866,841 B1 | 10/2014 | Distler | |
| 8,885,941 B2 | 11/2014 | Schiller | |
| 8,922,628 B2 | 12/2014 | Bond | |
| 8,970,714 B2 | 3/2015 | Miyoshi | |
| 9,230,306 B2 | 1/2016 | Sun | |
| 9,247,156 B2 | 1/2016 | Tsuda | |
| 9,264,681 B2 | 2/2016 | Gish | |
| 9,466,113 B2 | 10/2016 | Pham | |
| 9,569,827 B2 | 2/2017 | Yokokawa | |
| 9,858,649 B2 | 1/2018 | Liang | |
| 10,019,810 B2 | 7/2018 | Arnison | |
| 10,070,052 B2 | 9/2018 | Fukui | |
| 10,129,524 B2 | 11/2018 | Ng | |
| 10,217,195 B1 | 2/2019 | Agrawal | |
| 10,244,244 B2 | 3/2019 | Piramanayagam | |
| 10,298,834 B2 | 5/2019 | Pitts | |
| 2002/0052692 A1* | 5/2002 | Fahy | G16B 40/00 422/68.1 |
| 2011/0091073 A1* | 4/2011 | Iwasaki | G06T 7/215 382/103 |
| 2012/0327172 A1* | 12/2012 | El-Saban | G06T 7/174 348/14.02 |
| 2013/0259114 A1 | 10/2013 | Carlsson | |
| 2014/0269910 A1 | 9/2014 | Chai | |
| 2014/0321561 A1 | 10/2014 | Stec | |
| 2015/0235443 A1 | 8/2015 | Schowengerdt | |
| 2015/0326846 A1 | 11/2015 | Stec | |
| 2016/0098843 A1* | 4/2016 | Hashiguchi | G06T 7/162 382/164 |
| 2017/0278289 A1 | 9/2017 | Marino | |
| 2018/0146121 A1 | 5/2018 | Hensler | |
| 2018/0367752 A1 | 12/2018 | Donsbach | |
| 2019/0042826 A1* | 2/2019 | Chang | G06T 7/11 |
| 2019/0098302 A1 | 3/2019 | Alakuijala | |
| 2019/0253637 A1 | 8/2019 | Savoie | |
| 2019/0261049 A1 | 8/2019 | Aljoscha | |
| 2022/0237789 A1* | 7/2022 | Nie | G06F 18/24147 |

OTHER PUBLICATIONS

Bo Peng, et al "A Survey of graph theoretical approaches to image segmentation" Pattern Recognition, vol. 46, No. 3, Mar. 1, 2013 (Mar. 1, 2013), pp. 1020-1038.

Tse-Wei Chen et al: "Fast image segmentation based on K-Means clustering with histograms in HSV color space", Multimedia Signal Processing, 2008 IEEE 10th Workshop on, IEEE, Piscataway, NJ, USA,Oct. 8, 2008 (Oct. 8, 2008), pp. 322-325.

Yin Li et al: "Lazy snapping", 20040801, Aug. 1, 2004 (Aug. 1, 2004), pp. 303-308.

"Bezier Curve", https://en.wikipedia.org/wiki/B%C3%A9zier_curve, 12 Pages.

"Bresenham Line Algorithm", https://en.wikipedia.org/wiki/Bresenham%27s_line_algorithm, Jan. 20, 2025, 10 Pages.

"Graph Cuts", https://en.wikipedia.org/wiki/Graph_cuts_in_computer_vision, Oct. 9, 2024, 6 Pages.

"Maximum flow problem", https://en.wikipedia.org/wiki/Maximum_flow_problem, Oct. 27, 2024, 15 Pages.

Matlab "bwboundaries", https://www.mathworks.com/help/image/ref/bwboundaries.html, 10 Pages.

Radhakrishna Achanta, et al., "SLIC Superpixels", EPFL Technical Report 149300, Jun. 2010, 4 Pages.

* cited by examiner

USER-GUIDED IMAGE SEGMENTATION METHODS AND PRODUCTS

CROSS-REFERENCE TO RELATED APPLICATIONS

This application claims priority to U.S. Provisional Patent Application No. 62/944,847, filed 6 Dec. 2019, and European Patent Application No. 19214123.2, filed 6 Dec. 2019, both of which are incorporated herein by reference.

TECHNICAL FIELD

The present application relates to image segmentation, for example for the purpose of selecting a region of interest.

BACKGROUND

Image segmentation refers to the process of partitioning a digital image into multiple segments. A wide range of applications benefit from automatic image segmentation, such as machine vision, face recognition, video surveillance, and video editing. In such applications, image segmentation may be used to locate objects or edges in an image. Typically, image segmentation is performed automatically in software. A variety of algorithms exist for this purpose, ranging from very simple to highly complex.

In digital movie production, it is very common to enhance the captured video footage to create a final look for the movie. The originally captured colors may be modified to optimize the movie for viewing on a particular type of screen, correct for variation in lighting/colors, create a special effect, and/or to achieve a desired artistic feel. Such enhancement is typically performed by a colorist on a color-grading computer system equipped with color grading software and a control board providing color controls akin the sound controls in a music studio.

SUMMARY

In an embodiment, a method for user-guided image segmentation includes (a) clustering, based upon k-means clustering, pixels of an image into a plurality of first clusters, (b) outputting a cluster map of the first clusters, wherein the cluster map comprises non-disjoint pixel-clusters and disjoint pixel-clusters, wherein, within each of the non-disjoint pixel-clusters, any pair of pixels are immediately adjacent each other or connected to each other via one or more other pixels of the non-disjoint pixel-cluster (c) re-clustering, at least in part by processing connectivity of pixels within the first clusters, the pixels into a new plurality of non-disjoint pixel-clusters wherein the step of re-clustering re-clusters only the non-disjoint pixel-clusters of the map of the first clusters and (d) classifying each of the non-disjoint pixel-clusters in one of a plurality of categories, according to a user-indicated classification of a proper subset of the non-disjoint pixel-clusters in the categories.

In an embodiment, the re-clustering step comprises assigning new labels only to non-disjoint pixel clusters containing at least a threshold number of pixels. The new label defines a respective one of the non-disjoint pixel cluster of the new plurality of non-disjoint pixel-clusters.

In an embodiment, the re-clustering step further comprises applying morphological filters to the map of the first clusters to enhance connectivity of pixels within the first clusters.

In an embodiment, the re-clustering comprises performing a raster scan through all non-disjoint pixel clusters of the cluster map in a certain pattern, and merging each non-disjoint pixel cluster that is smaller than a threshold number of pixels into the most recent non-disjoint cluster, in the raster scan, that has at least the threshold number of pixels. Alternatively, and/additionally, merging of each non-disjoint pixel cluster smaller than the threshold is performed with an adjacent non-disjoint pixel cluster that has at least the threshold number of pixels.

In an embodiment, the re-clustering step comprises before applying morphological filters to the map of the first clusters, obtaining a binary mask for each cluster for processing each cluster separately with morphological filters.

In an embodiment, the step of applying morphological filters comprises applying a closing operation function and an opening operation function for filling pixel gaps in each one of the first clusters and obtaining an updated cluster map of the first clusters.

In an embodiment, merging each non-disjoint pixel cluster comprises re-labelling each non-disjoint pixel cluster that is smaller than the threshold with a label of the most recent (and/or adjacent) non-disjoint cluster that has at least the threshold number of pixels. The label defines a respective one of the non-disjoint pixel clusters.

In an embodiment, wherein $\mathbb{C}^{(l)}$ is the map of non-disjoint pixel clusters for a l region, $N_{c\,(l)}$ is the number of non-disjoint pixel clusters in the l'th region, $v_{(l)}^{(c)}$ is the c'th non-disjoint pixel cluster of l'th region, $n_{cb}^{(c)}$ is the number of pixels within the c'th non-disjoint pixel cluster $v_{(l)}^{(c)}$ and $T_{KC}$ is the threshold number of pixels in c'th non-disjoint pixel cluster. If $N_{c\,(l)}>1$ and $n_{cb}^{(c)} \geq T_{KC}$ a new label to the c'th non-disjoint pixel cluster is assigned, and if $n_{cb}^{(c)} < T_{KC}$, the c'th non-disjoint pixel cluster is merged with an adjacent non-disjoint pixel cluster.

In an embodiment, for each c'th non-disjoint pixel cluster $v_{(l)}^{(c)}$ a bounding box is defined surrounding the c'th non-disjoint pixel cluster $v_{(l)}^{(c)}$ by taking minimum and maximum horizontal and vertical x-y coordinates of the c'th non-disjoint pixel cluster $v_{(l)}^{(c)}$ in a cartesian coordinate system for representing the image. The adjacent non-disjoint pixel cluster is identified by the pixel computed as:

$$(x_{(l)}^{(c),TL}, y_{(l)}^{(c),TL}) = (\max\{(x_{(l)}^{(c),min}-1), 0\}, \max\{(y_{(l)}^{(c),min}-1), 0\}),$$

$(x_{(l)}^{(c),TL}, y_{(l)}^{(c),TL})$ represent the horizontal and vertical coordinates of the pixel in the adjacent non-disjoint pixel cluster TL. $x_{(l)}^{(c),min}$ and $y_{(l)}^{(c),min}$ represent the minimum horizontal and vertical coordinates of the c'th non-disjoint pixel cluster $v_{(l)}^{(c)}$.

In an embodiment, a software product for image segmentation includes computer-readable media storing machine-readable instructions. The instructions include clustering instructions that, when executed by a processor, control the processor to (a) cluster, based upon k-means clustering, pixels of an image into a plurality of first clusters and (b) store, to a memory, a k-means-cluster-map of the first clusters. The instructions further include re-clustering instructions that, when executed by the processor, control the processor to (a) retrieve the k-means-cluster-map from memory, (b) process connectivity of pixels within the first clusters of the k-means-cluster-map to re-cluster the pixels into a plurality of non-disjoint pixel-clusters such that any pair of pixels within each of the non-disjoint pixel-clusters are immediately adjacent each other or connected to each other via one or more other pixels of the non-disjoint pixel-cluster, and (c) store, to the memory, a connectedcluster-map of the non-disjoint pixel-clusters. The instructions also include classification instructions that, when executed by the processor, control the processor to classify each of the non-disjoint pixel-clusters in one of a plurality of categories, according to a user-specified classification of a proper subset of the non-disjoint pixel-clusters in the categories.

In an embodiment, another method for user-guided image segmentation includes (a) forming a graph having a plurality of terminals and a plurality of nodes, wherein each of the nodes corresponds to a first respective non-disjoint pixel-cluster of the image and is connected, in the graph, to each of the terminals and all other ones of the nodes corresponding to other respective non-disjoint pixel-clusters that, in the image, are within a neighborhood of the first respective non-disjoint pixel-cluster, (b) initializing the graph by setting weights of connections of the graph at least partly according to a user input indicating classification of some but not all of the non-disjoint pixel-clusters in a plurality of categories respectively associated with the plurality of terminals, and (c) segmenting the image into the categories by cutting the graph based upon the weights.

In an embodiment, another software product for image segmentation includes computer-readable media storing machine-readable instructions. The instructions include graph setup instructions that, when executed by a processor, control the processor to form a graph having a plurality of terminals and a plurality of nodes, wherein each of the nodes corresponds to a respective non-disjoint pixel-cluster of the image and is connected, in the graph, to each of the terminals and all other ones of the nodes corresponding to other respective non-disjoint pixel-clusters that, in the image, are within a neighborhood of the respective non-disjoint pixel-cluster. The instructions further include graph initializing instructions that, when executed by the processor, control the processor to set weights of connections of the graph at least partly according to a user input indicating classification of some but not all of the non-disjoint pixel-clusters in a plurality of categories respectively corresponding to the plurality of terminals. The instructions also include graph cutting instructions that, when executed by the processor, control the processor to cut the graph based upon the weights so as to segment the image into the categories.

DESCRIPTION OF EXAMPLE EMBODIMENTS

Figure 1:
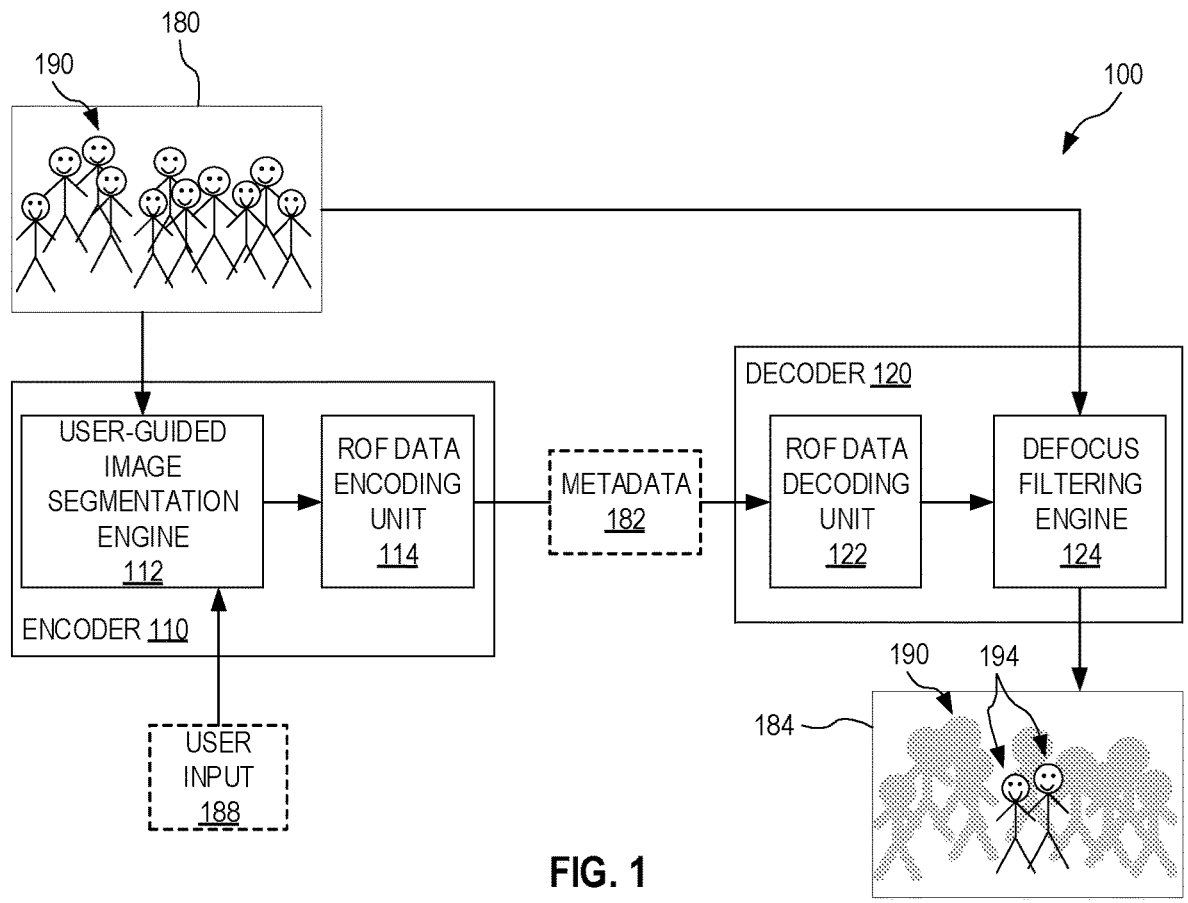
FIG. 1 illustrates a user-guided image segmentation engine in an example use scenario, according to an embodiment.

FIG. 1 illustrates one user-guided image segmentation engine 112 in an example use scenario. In the scenario of FIG. 1, image segmentation engine 112 is incorporated in a video processing pipeline 100 that manipulates the focus of an image 180 or of several images 180 of a video stream, to produce a focus-manipulated image 184 wherein a region of interest is kept in focus while other regions are defocused. In the example depicted in FIG. 1, image 180 contains a group of people 190 of which focus-manipulated image 184 keeps two people 194 in focus while remaining people 190 are defocused.

Pipeline 100 is useful in movie production and may be used by content creators for a variety of purposes. For example, the focus manipulation produced by pipeline 100 may serve to draw viewers' attention to a more important portion of a scene (e.g., people 194 or an advertisement/logo), produce a sense of depth, or give a more lifelike effect to a scene.

Pipeline 100 includes an encoder 110 and a decoder 120. Encoder 110 processes image 180 to generate metadata 182 specifying which portion of image 180 should be kept in focus and which portion of image 180 should be defocused. Decoder 120 processes image 180 to produce focus-manipulated image 184 according to metadata 182.

Encoder 110 includes image segmentation engine 112 and a region-of-focus (ROF) data encoding unit 114. Image segmentation engine 112 segments image 180 (or each of several images 180) according to desired focus properties of different portions of image 180. Image segmentation engine 112 is semiautomatic and includes a software product that applies an image segmentation process to image 180 with guidance from a user input 188 from a user, e.g., a colorist. In the example scenario of FIG. 1, image segmentation engine 112 segments image 180 into a focused portion and a defocused portion, such that each pixel of image 180 is assigned either to the focused portion or to the defocused portion. ROF data encoding unit 114 generates metadata 182 according to the image segmentation determined by image segmentation engine 112. Metadata 182 may encode the image segmentation as a specification of the boundaries between the focus categories. For example, metadata 182 may specify an outline of people 194.

Decoder 120 includes an ROF data decoding unit 122 and a defocus filtering engine 124. ROF data decoding unit 122 interprets metadata 182 to determine which portion of image 180 should be defocused, and defocus filtering engine 124 defocuses this portion of image 180 to produce image 184.

Encoder 110 may further encode, into metadata 182, a defocus strength to be applied by defocus filtering engine 124. The defocus strength may be defined by a user. In one implementation, metadata 182 specifies a maximum defocus strength, and defocus filtering engine 124 defocuses image 180 such that the degree of focus in focus-manipulated image 184 gradually transitions from no defocusing at a boundary of a region to kept in focus (e.g., people 194) to maximum defocus strength at the greatest distance from such boundaries. The optimal defocus strength may depend on the type of screen on which image 184 is to be displayed. For example, a screen with a higher dynamic range generally requires a greater degree of defocusing than a screen with a lower dynamic range to produce the same apparent effect.

The functionality of pipeline 100 is readily extended to segment image 180 into more than two different focus-level portions, for example a portion that is kept in focus, a portion that is moderately defocused, and a portion that is more strongly defocused.

The capability of image segmentation engine 112 reaches beyond segmentation for the purpose of focus manipulation. Image segmentation engine 112 may segment an image for any purpose. In one implementation, image segmentation engine 112 segments an image in a binary fashion such that all pixels of the image are classified in either one of two possible categories, for example region to be kept in focus versus region to be defocused or region of interest versus region not of interest. In another implementation, image segmentation engine 112 segments an image into three or more categories. Each of these three or more categories may indicate a desired level of defocusing to be applied or indicate a different type of object. Image segmentation engine 112 may thus be used by a user for a variety of different image enhancement purposes, and image segmentation engine 112 may also be used in other technology areas, such as machine vision.

Figure 2:
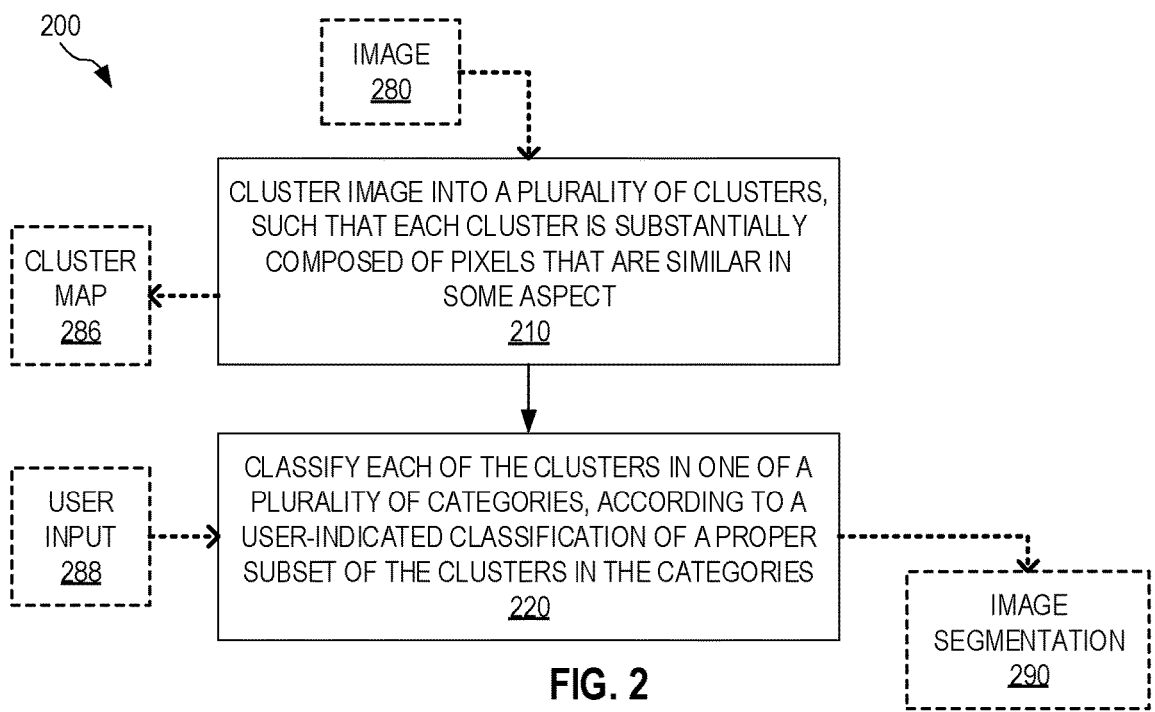
FIG. 2 illustrates a method for user-guided image segmentation, according to an embodiment.
Figure 3A:
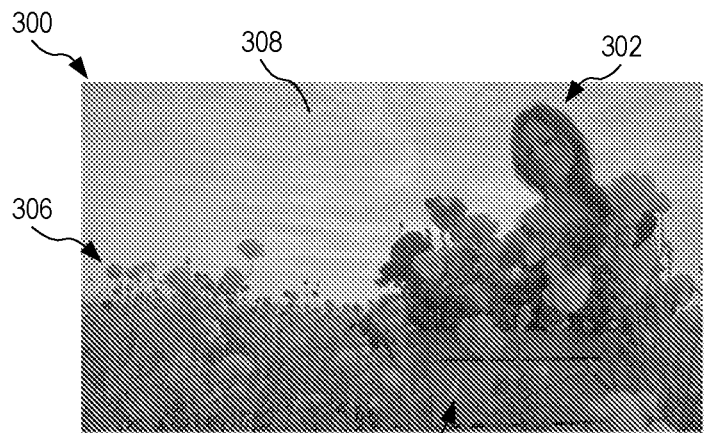
FIGS. 3A-C show an example of processing performed by the method of FIG. 2.
Figure 3B:
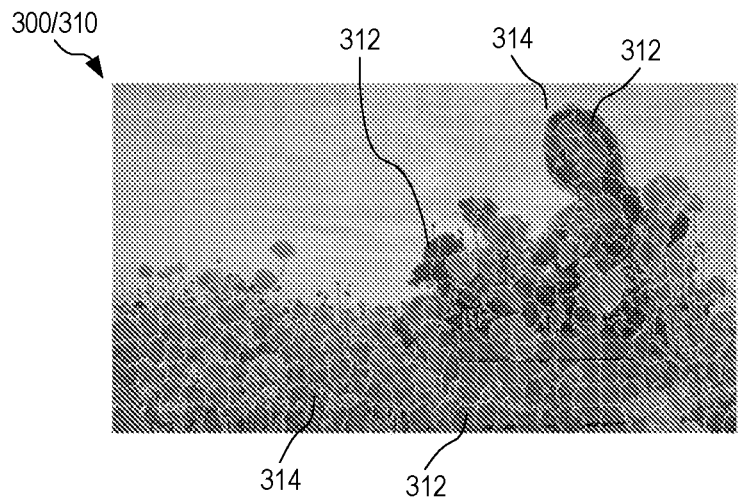
Figure 3C:
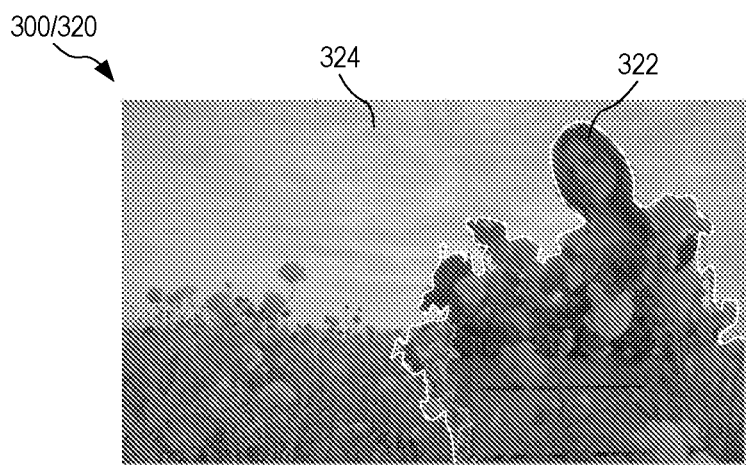

FIG. 2 illustrates one method 200 for user-guided image segmentation. Method 200 is encoded in a software product incorporated in image segmentation engine 112. In one implementation, image segmentation engine 112 includes a processor and a non-transitory memory encoding method 200 as machine-readable instructions executable by the processor. FIGS. 3A-C show an example of processing performed by method 200 FIGS. 2 and 3A-C are best viewed together in the following description.

Method 200 includes steps 210 and 220. Step 210 takes an image 280, such as image 180 as an input, and clusters image 280 into a plurality of clusters of interconnected pixels. Each of these clusters is substantially composed of pixels that are similar to each other in some aspect, for example in color and/or brightness. Step 210 may output a cluster map 286 that indicates the clustering of pixels performed by step 210. Step 210 does not require user guidance and may be formed fully automatically, although it is understood that a user may define certain processing parameters, for example influencing the general size scale of the clusters.

FIG. 3A shows an image 300 which is an example of image 280. Image 300 depicts a woman 302 in a field of flowers 306 with the sky 308 in the background. Some of flowers 306 are in a box 304 at woman 302. In this example scenario, a user wishes to select a region of interest, such as woman 302 box 304, and those of flowers 306 that are in box 304. Doing this manually would be tedious, especially if image 300 is part of a video stream with moving objects and the segmentation is to be applied to the entire video stream. Step 210 of method 200 processes image 300 to form the clusters indicated by cluster map 310 overlaid on image 300 in FIG. 3B. Individual non-disjoint pixel-clusters of cluster map 310 are outlined with light gray borders. Herein, a "non-disjoint pixel-cluster" refers to a cluster of pixels that cannot be decomposed into two or more disjoint segments. In other words, any two pixels in a non-disjoint pixel-cluster are immediately adjacent each other or connected to each other via one or more other pixels of the cluster. In the field of topology, a non-disjoint pixel-cluster would be referred to as a "connected set" of pixels. It is understood that a single pixel may be considered a non-disjoint pixel-cluster. Alternatively, only clusters of pixels with at least a threshold number of pixels may qualify as a non-disjoint pixel-cluster, and smaller clusters of pixels and single pixels may be instead merged into an adjacent cluster of pixels. It is understood that a "disjoint pixel-cluster" refers to a cluster of pixels that can be decomposed into one or more disjoint segments. For example, a disjoint pixel cluster may contain pixels of different characteristic such as of different pixel color, pixel location, etc. Cluster map 310 is an example of cluster map 286.

Step 220 classifies each of the clusters, determined in step 210, in one of a plurality of categories. Step 220 performs this classification according to a user input 288. User input 288 indicates classification of a proper subset of the clusters (i.e., some but not all of the clusters) in these categories. Based on user input 288 and an evaluation of similarity between clusters, such as color and location similarity, step 220 automatically classifies all remaining clusters in the categories, to produce an image segmentation 290. The number of clusters directly classified by user input 288 may be as small as a single cluster for each category, although for more complex image scenes and image segmentation demands, a larger number of clusters may need to be directly classified by user input 288 in order to reliably achieve the desired image segmentation. The user generating user input 288 may do so based on image 280 alone or based on a combination of image 280 and the cluster map generated in step 210. When based on image 280 alone, user input 288 may simply indicate the classification of certain pixels of image 280, and step 220 then classifies the corresponding clusters accordingly before proceeding to classify the remaining clusters.

In the example of FIGS. 3A-C, the associated user input 288 classifies certain clusters 312 as belonging to the region of interest and certain other clusters 314 as not belonging to the region of interest (see FIG. 3B). It is understood that the actual number of clusters thus classified by the user may differ from that shown in FIG. 3B. For example, a user may classify a larger number of clusters near the boundaries of the region of interest. Based on this user input, step 220 then classifies the remaining clusters as either belonging or not belonging to the region of interest, so as to arrive at the image segmentation 320 shown in FIG. 3C, where a white border outlines the boundary between region of interest 322 and the remainder 324 of image 300.

The manual effort required by a user to guide the image segmentation of method 200 consists merely in indicating the classification of relatively few clusters or pixels. In contrast, completely manual image segmentation would typically require drawing a boundary around the region of interest, which would be a far more tedious process. At the opposite end of the spectrum, fully automatic image segmentation would likely fail unless preconfigured to search for a certain type of object in the image. Compared to completely manual image segmentation and fully automatic image segmentation, method 200 benefits from a high level of automation combined with relatively effortless user guidance to provide accurate image segmentation in a manner that is inherently adaptable to varying image content and varying image segmentation goals. The level of automation provided by method 200 is especially advantageous when processing a video stream. As discussed in further detail below in reference to FIG. 6, user guidance provided for a few images or even a single image of a video stream, such as a video stream of one scene in a movie, may be applied to segmentation of the entire video stream.

Although not shown in FIG. 2, method 200 may include iteratively repeating step 220. For example, image segmentation 290 may be displayed to the user. If dissatisfied with image segmentation 290, the user may modify user input 288, for example to classify additional clusters or pixels, and feed this revised user input 288 to another iteration of step 220. When method image segmentation engine 112 implements method 200, ROF data encoding unit 114 encodes image segmentation 290 in metadata 182.

Figure 4:
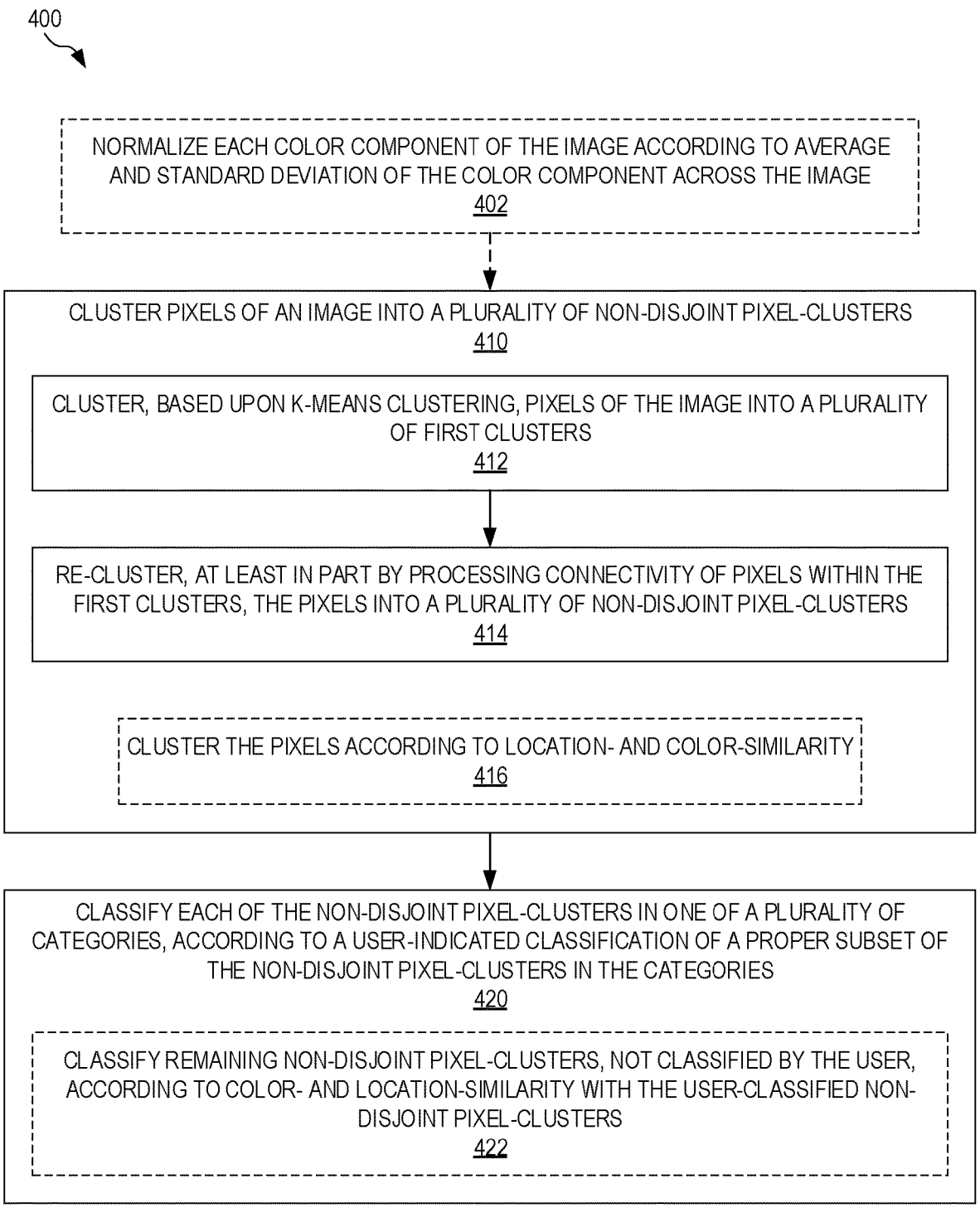
FIG. 4 illustrates a method for user-guided image segmentation, which utilizes two clustering steps, according to an embodiment.

FIG. 4 illustrates one method 400 for user-guided image segmentation, which utilizes two clustering steps. Method 400 includes steps 410 and 420, which are embodiments of steps 210 and 410, respectively, of method 200. Step 410 clusters pixels of an image into a plurality of non-disjoint pixel-clusters. Step 420 classifies each of the non-disjoint pixel-clusters, determined in step 410, in one of a plurality of categories according to a user-indicated classification of a proper subset of the non-disjoint pixel-clusters in the categories.

Step 410 includes steps 412 and 414. Step 412 uses k-means clustering to cluster the pixels of the image into a plurality of first clusters. Each first cluster is not necessarily a non-disjoint pixel-cluster. For example, a first cluster, as determined by step 412 may include two or more disjoint clusters separated from each other by one or more other pixels. Step 414 re-clusters the pixels into a plurality of non-disjoint pixel-clusters. The re-clustering in step 414 is achieved at least in part by processing the connectivity of pixel within the first clusters.

Figure 5A:
FIGS. 5A and 5B show an example of processing performed by the method of FIG. 4.
Figure 5B:
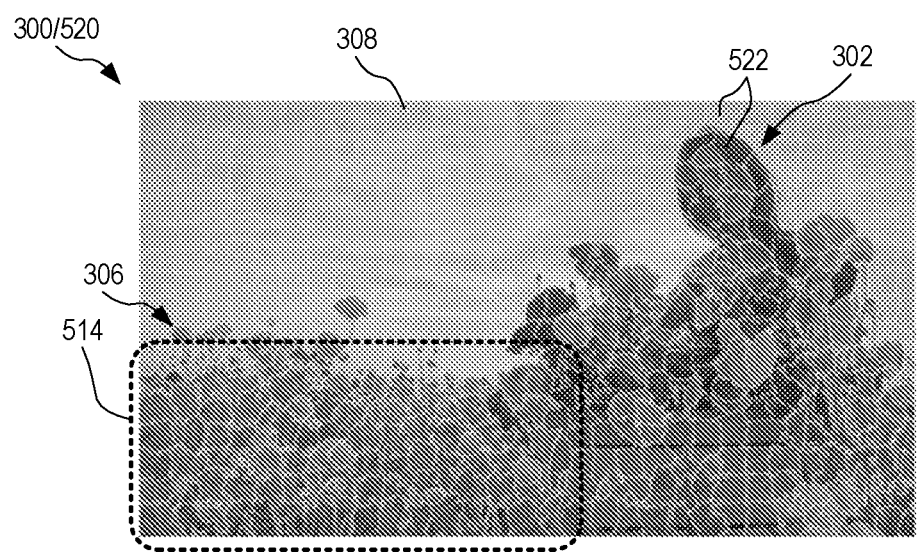

FIGS. 5A and 5B show an example of processing performed by method 400. FIG. 5A is a map 510 of first clusters 512 generated in step 410 based on image 300 of FIG. 3A. Clusters 512 are indicated by different grayscales in FIG. 5A. For clarity of illustration, only two clusters 512 are labeled in FIG. 5A. Some regions of cluster map 510 exhibit a lesser degree of connectedness than other regions of map 510. For example, clusters 512 in region 514 appear relatively disjointed. If cluster map 510 was fed directly to step 420, the complexity of clusters 512 in region 514 might degrade the performance of classification in step 420 and/or require more comprehensive classification to be done by the user to sufficiently guide classification of the remaining clusters.

FIG. 5B shows a map 520 of non-disjoint pixel-clusters 522, as determined by step 414, overlaid on image 300. For clarity of illustration, only two clusters 522 are labeled in FIG. 5B. It is evident that each cluster 522 is a non-disjoint pixel-cluster. The difference between cluster map 510 and cluster map 520 is significant in some regions, for example in region 514. As compared to cluster map 510, cluster map 520 is a greatly improved starting point for step 420. Even though clusters 522 of cluster map 520 are on a more regular grid and, in many places, of more regular shape, the shape of clusters 522 conforms to significant boundaries, such as the boundary between the head of woman 302 and sky 308 and the perimeter of individual flowers 306. Without user guidance, however, it would be challenging to automatically delineate between region of interest 322 and the remainder 324 of image 300 (see FIG. 3C). For example, user input may be particularly necessary in the field of flowers 306 to define the desired segmentation between region of interest 322 and the remainder 324 of image 300.

Referring again to FIG. 4, step 410 may implement a step 416 of clustering the pixels according to location similarity and color similarity. In one embodiment, step 410 implements step 416 such that the k-means clustering of step 412 is based on location similarity and color similarity of pixels. Similarly, step 420 may implement a step 422 of classifying the remaining non-disjoint pixel-clusters, not classified by the user input, according to location similarity and color similarity with the user-classified non-disjoint pixel-clusters. Step 422 helps reduce the number of clusters that must be classified directly by the user in order to achieve satisfactory image segmentation performance. As an example, in the FIG. 5B, color-similarity evaluation of clusters 522 may significantly aid delineation between woman 302 and sky 308 if only a few clusters 522 on either side of the boundary have been classified by the user.

Step 410 may be preceded by a step 402 of normalizing each color component of the image according to average and standard deviation of the color component across the image. In an embodiment of step 402 configured to process an image with three color channels, the color channels have respective means $\mu_1$, $\mu_2$, and $\mu_3$ and respective standard deviations $SD_1$, $SD_2$, and $SD_3$:

$$\mu_i = \frac{1}{N_i} \sum_{p=0}^{N_i-1} I_p^{(i)}, \ i = 1, 2, 3,$$

$$SD_i = \sqrt{\frac{1}{N_i - 1} \sum_{p=0}^{N_i-1} (I_p^{(i)} - \mu_i)^2}, \ i = 1, 2, 3,$$

wherein $N_i$ is the number of pixels in the i'th color channel, and $I_p^{(i)}$ is the value of the p'th pixel of the i'th color channel. For the p'th of the i'th color channel, the normalized pixel value is $$T_p^{(i)} = \frac{(I_p^{(i)} - \mu_i)}{SD_i}, \ i = 1, 2, 3.$$

The three color channels may be YCbCr, i.e., luma, blue-difference, and red-difference. Alternatively, the three color channels may be RGB, i.e., red, green, and blue. Step 402 has been found, empirically, to improve the clustering performance of step 410, at least under some circumstances.

Figure 6:
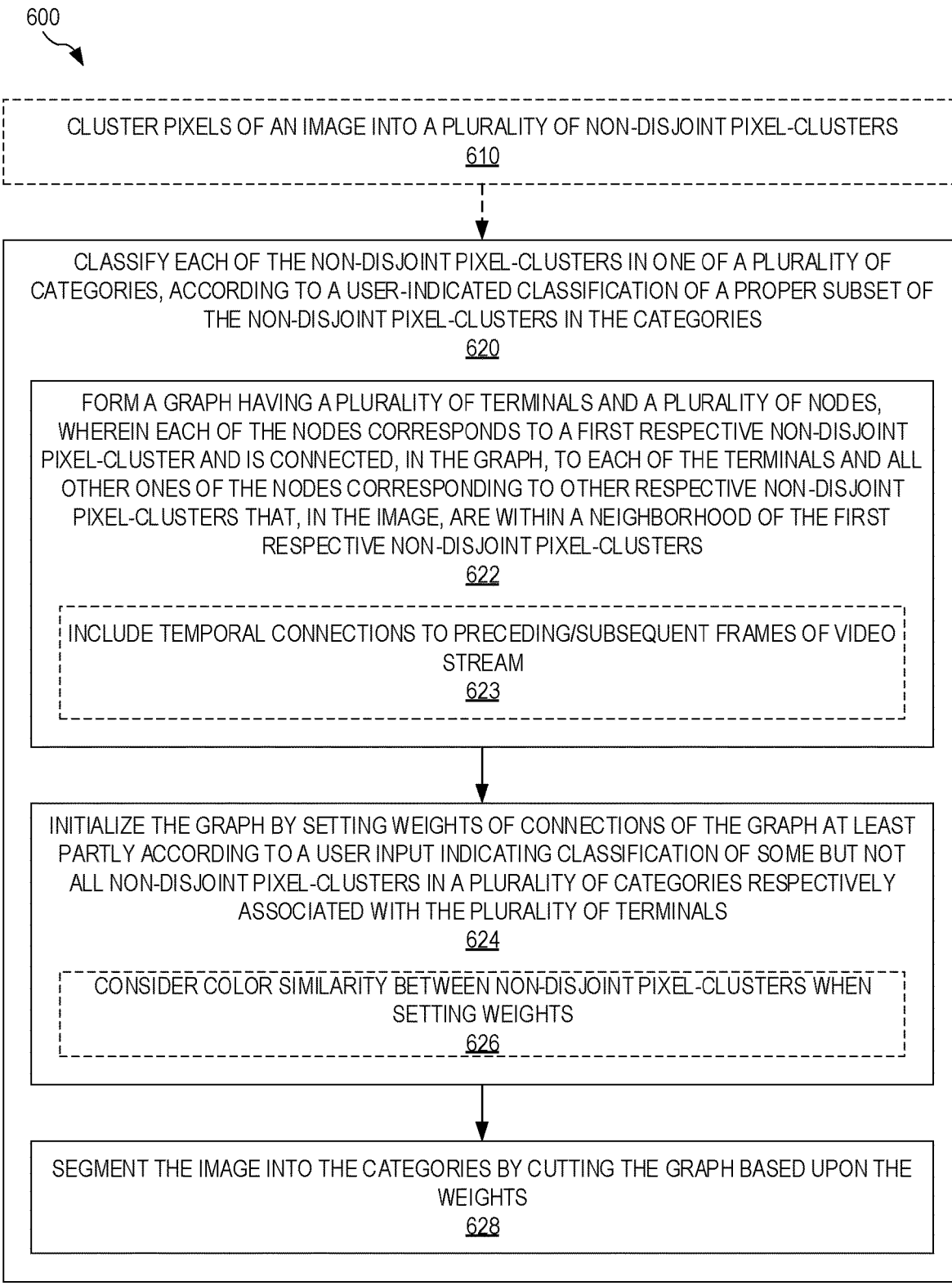
FIG. 6 illustrates a user-guided image segmentation method that utilizes graph cutting, according to an embodiment.

FIG. 6 illustrates one user-guided image segmentation method 600 that utilizes graph cutting. Method 600 may be performed on its own but also after method 200 of FIG. 2 or method 400 of FIG. 4. In the latter cases, the image may have been already segmented into non-disjoint pixel clusters. Method 600 may further enhance segmentation. FIGS.

7A-C illustrate certain aspects of method 600. FIGS. 6 and 7A-C are best viewed together in the following description. Method 600 includes a step 620 of classifying each of a plurality of non-disjoint pixel-clusters of an image in one of a plurality of categories, according to a user-indicated classification of a proper subset of the non-disjoint pixel-clusters in those categories. Step 620 may be preceded by a step 620 of clustering pixels of the image into the plurality of non-disjoint pixel-clusters. Step 620 may implement step 410, and optionally also step 402, of method 400. Step 620 is an embodiment of step 210 of method 200. Step 620 is an embodiment of step 220 of method 200 and may be implemented in step 420 of method 400.

Step 620 includes steps 622, 624, and 628. Step 622 forms a graph having a plurality of terminals and a plurality of nodes. Each node corresponds to a first respective non-disjoint pixel-cluster of the image. Each node is connected to each of the terminals. Each node is also connected to all other nodes corresponding to other respective non-disjoint pixel-clusters of the image that, in the image, are within a neighborhood of the first respective non-disjoint pixel-cluster of the image. Herein, a "neighborhood" of a cluster (e.g., a non-disjoint pixel-cluster) refers to a local region or the image that is centered at the cluster and is smaller than the full image. A "neighborhood" may be (a) all pixels of the image within a certain distance of a center location of the cluster, or (b) all pixels of the image within a square centered on the center location of the cluster, wherein the square has a certain side length.

Figure 7A:
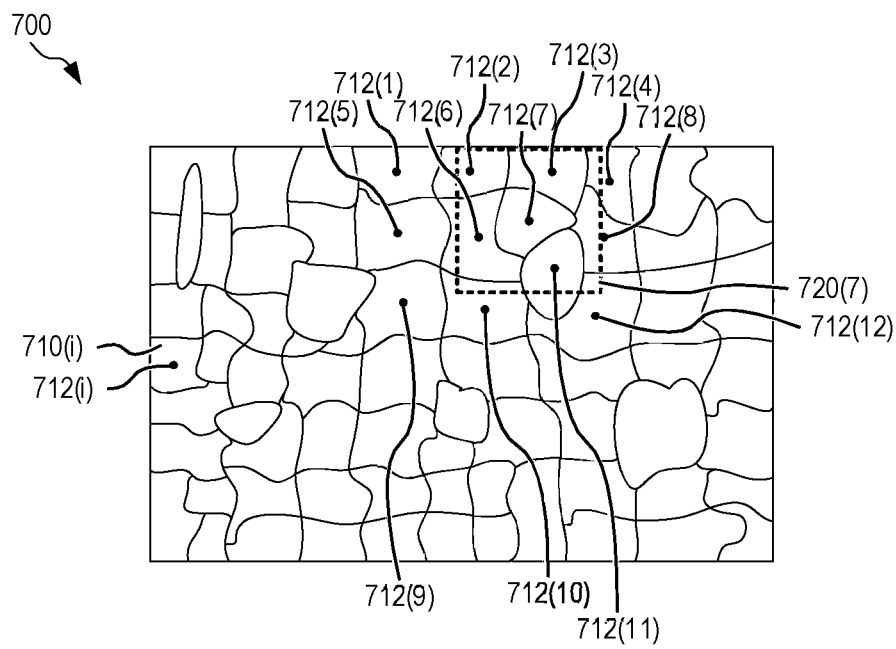
FIGS. 7A-C illustrate, by example, certain aspects of the method of FIG. 6.
Figure 7B:
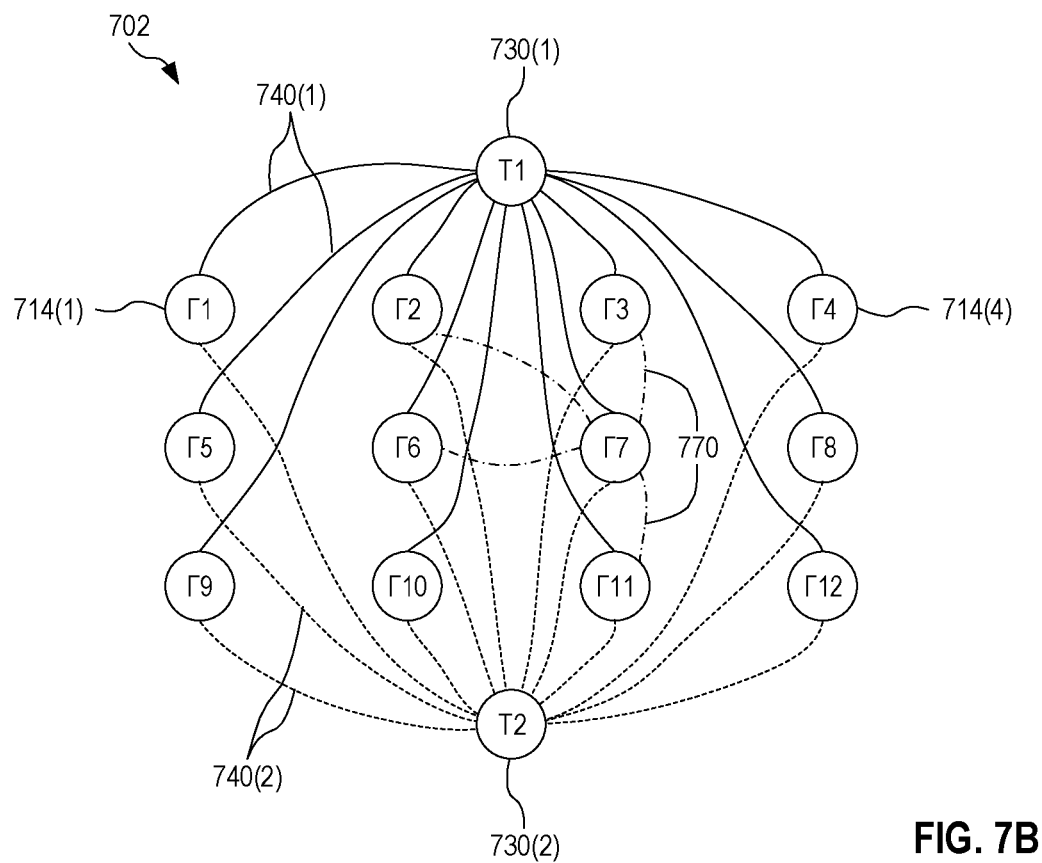

FIG. 7A shows an example image 700 that has been clustered into non-disjoint pixel-clusters 710($i$). Each non-disjoint pixel-cluster 710($i$) has a center location 712($i$). For clarity of illustration, not all non-disjoint pixel-clusters are labeled in FIG. 7A, and only some of center locations 712($i$), namely center locations 712(1), 712(2), . . . , 712(12), are labeled in FIG. 7A. FIG. 7B is a portion of a graph 702 based on non-disjoint pixel-clusters 710. Graph 702 includes a plurality of nodes 714($i$), also labeled "Ti". Each node 714($i$) corresponds to a respective center location 712($i$) and thus to a respective non-disjoint pixel-cluster 710($i$). For clarity of illustration, graph 702 shows only nodes 714(1), 714(2), . . . , 714(12). It is understood that graph 702 includes a node 714 for each non-disjoint pixel-cluster 710 of image 700. Graph 702 further includes two terminals 730(1) and 730(2), also labeled "T1" and "T2".

Since graph 702 has only two terminals, graph 702 is configured to do binary image segmentation. Without departing from the scope hereof, graph 702 may instead include more than two terminals to segment image 700 into more than two different categories.

Each node Γi is connected to terminals T1 and T2 via respective node-to-terminal connections 740(1) (solid lines) and 740(2) (dashed lines). Each node Γi is further connected, via node-to-node connections 770 (dash-dot lines), to all other nodes Γj that correspond to center locations 712($j$) within a neighborhood 720($i$) of the center location 712($i$) corresponding to node Γi. For example, in FIG. 7A, center location 712(7) defines a neighborhood 720(7). Only center locations 712(2), 712(3), 712(6), and 712(11) are within neighborhood 720(7) of center location 712(7). Therefore, node Γ7 is connected, via node-to-node connections 770, only to nodes Γ2, Γ3, Γ6, and Γ11. In a similar manner, each of nodes Γ1, . . . , Γ6, and Γ8, . . . , Γ12 have node-to-node connections 770 to nodes that correspond to center locations 712 within the neighborhood of the center location corresponding to the node under consideration. However, for clarity of illustration, these node-to-node connections are not shown in FIG. 7B. In one embodiment, node-to-terminal connections 740 are directional, such that each node-to-terminal connections 740(1) is in the direction from terminal T1 to a node, and each node-to-terminal connections 740(2) is in the direction from a node to terminal T2.

Step 624 initializes the graph, generated in step 622, by setting weights of connections of the graph at least partly according to a user input. The user input classifies some but not all of the non-disjoint pixel-clusters in two or more categories. Each category is associated with a respective terminal in the graph. Node-to-terminal connections for nodes that are directly classified by the user input are assigned weights according to the user input, and these weights serve as anchors for the graphs. Step 624 sets weights for other node-to-node connections according to a consideration of a form of similarity between non-disjoint pixel-clusters associated with the nodes. In one embodiment, step 624 includes a step 626 that considers color similarity between non-disjoint pixel-clusters when setting weights for node-to-node connections. The node-to-node connection weights determined based upon a similarity consideration can be viewed as defining strengths of a mesh between nodes, while each node-to-terminal connection weights, set directly according to the user input, anchors a respective point of this mesh more strongly to one terminal than any other terminal.

In the example of graph 702, the user input may (a) classify non-disjoint pixel-cluster 710(7) in the category associated with terminal T1, (b) classify non-disjoint pixel-cluster 710(11) in the category associated with terminal T2, and (c) leave non-disjoint pixel-clusters 710(1), 710(2), 710(3), 710(4), 710(5), 710(6), 710(8), 710(9), 710(10), and 712(12) unclassified. In this example, step 712 sets weights of node-to-terminal connections 740(1) and 740(2) for nodes Γ7 and Γ11 directly according to the user input. Step 712 then sets weights of node-to-node connections 770 based upon a similarity consideration, such as color similarity between non-disjoint pixel-clusters 710($i$) associated with nodes connected by node-to-node connections 770.

Step 628 segments the image into the categories by cutting the graph, generated in step 622, based upon the weights defined in step 624. More specifically, step 628 cuts connections of the graph, based upon the weights, such that each node is connected, directly or via one or more other nodes, to exactly one terminal. Step 628 may utilize a graph cutting algorithm known in the art, such as max-flow min-cut. In one example, step 628 cuts graph 702 such that each node 714 is connected, directly or via one or more other nodes 714, to one but not both of terminals T1 and T2.

In certain embodiments, method 600 is applied to a video stream and step 622 implements a step 623 to consider several sequential images of the video stream in conjunction with each other. Step 623 includes "temporal connections" to one or more preceding and/or subsequent frames of the video stream. The resulting graph includes (a) node-to-node connections 770 within each frame of the video stream, (b) node-to-terminal connections 740 for at least one frame of the video stream, and (c) temporal connections that connect nodes of each frame to nodes of at least one other frame so as to link a plurality of sequential frames to each other in the same graph. Step 712 then sets weights for all connections of the graph, including the temporal connections, and step 628 cuts the graph to simultaneously segment all frames under consideration. In one embodiment, the temporal connections formed in step 623 may be similar to the intra-frame node-to-node connections (e.g., node-to-node connections 770). In this embodiment, temporal connections for any given node are limited to be extended to nodes of other frames that are within the neighborhood of the node under consideration.

Figure 7C:
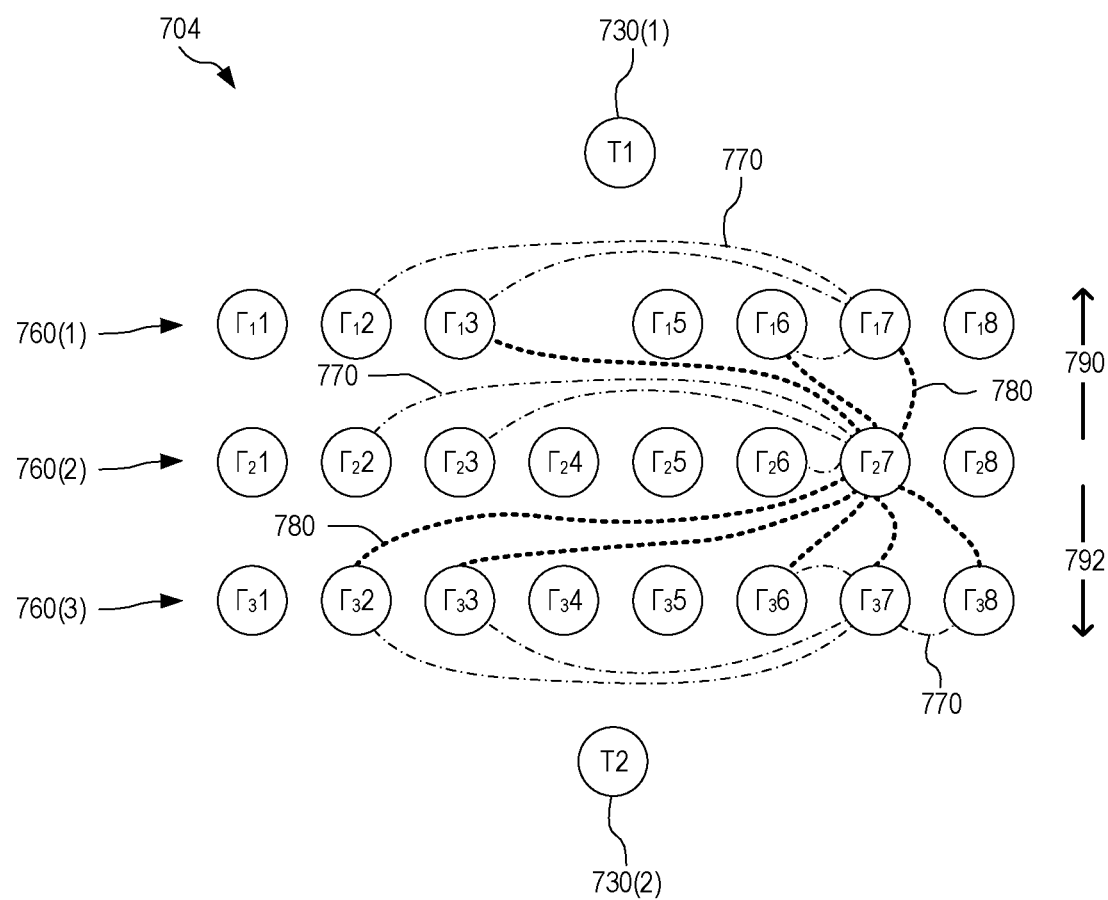

FIG. 7C illustrates an example extension of graph 702 to a graph 704 that further includes temporal connections. Nodes $\Gamma_2 i$ of a frame 760(2) are (a) linked back in time (in direction 790) via temporal connections 780 to nodes $\Gamma_1 i$ of a preceding frame 760(1) and (b) linked forward in time (in direction 792) via other temporal connections 780 to nodes $\Gamma_3 i$ of a subsequent frame 760(3). Graph 704 thus links frames 760(1), 760(2), and 760(3) in a single graph. Frame 760(2) corresponds to image 700 of FIG. 7A. The same set of terminals, T1 and T2, are used for all frames. For clarity of illustration, node-to-terminal connections 740 are not drawn in FIG. 7C, intra-frame node-to-node connections 770 are drawn for nodes $\Gamma_1 7$, $\Gamma_2 7$, and $\Gamma_3 7$ only and some of these node-to-node connections are omitted, and temporal connections 780 are drawn for node $\Gamma_2 7$ only. It is further understood that graph 704 includes many more nodes than depicted in FIG. 7C, to represent all non-disjoint pixel-clusters 710 of each frame 760.

Since the scene content of frames 760 may be dynamic, non-disjoint pixel-clusters 710 may shift, appear, or go away between one frame and the next. In the example depicted in FIG. 7C, there is no node $\Gamma_1 4$ in frame 760(1) because non-disjoint pixel-cluster 710(4) of frame 760(2) does not have a counterpart in frame 760(1). Also, frame 760(3) includes a node-to-node connection 770 between nodes $\Gamma_3 7$ and $\Gamma_3 8$ because, in frame 760(3) node $\Gamma_3 8$ is within the neighborhood of node $\Gamma_3 7$. Based on the center locations of the non-disjoint pixel-clusters corresponding to the nodes depicted in FIG. 7C, nodes $\Gamma_1 3$, $\Gamma_1 6$, and $\Gamma_1 7$, but not node $\Gamma_1 2$, are within the neighborhood of node $\Gamma_2 7$. Node $\Gamma_2 7$ is therefore connected to nodes $\Gamma_1 3$, $\Gamma_1 6$, and $\Gamma_1 7$, via temporal connections 780, but not to node $\Gamma_1 2$ even though node $\Gamma_2 7$ is connected to node $\Gamma_2 2$ via intra-frame node-to-node connection 770.

In embodiments of method 600 that process a video stream and include step 623 to collectively consider a plurality of frames of the video stream, the user-indicated classification utilized in step 712 may pertain to a single one of the frames or pertain several frames. In one example, method 600 collectively considers three or more frames, but the user generates all user-indicated classifications from a single frame only. This saves the user from having to consider every single frame of the video stream, and these embodiments of method 600 may significantly reduce the amount of work required by the user.

Figure 8:
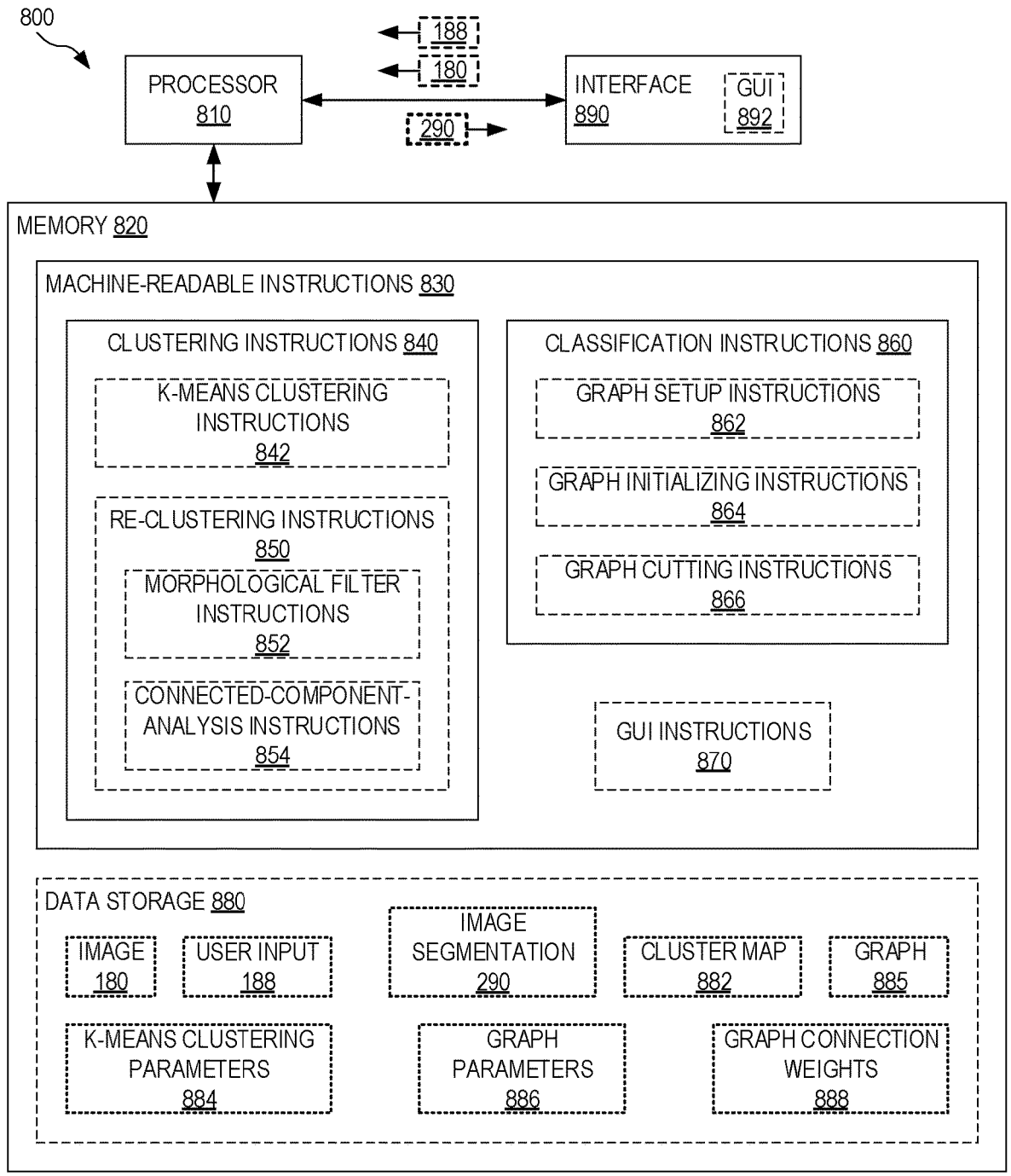
FIG. 8 illustrates a computer for user-guided image segmentation, according to an embodiment.

FIG. 8 illustrates one computer 800 for user-guided image segmentation. Computer 800 is an embodiment of user-guided image segmentation engine 112 and may perform any one of methods 200, 400, and 600. Computer 800 includes a processor 810, a non-transitory memory 820, and an interface 890. Memory 820 includes machine-readable instructions 830 that are executable by processor 810. Memory 820 may further include a data storage 880. In operation, computer 800 receives image 180 (or a video stream of images 180) and user input 188. Guided by user input 188, computer 800 segments image(s) 180 such that each pixel of each image 180 is classified in one of a plurality of categories. Instructions 830 include clustering instructions 840 and classification instructions 860.

When executed by processor 810, clustering instructions 840 control processor 820 to perform step 210 of method 200, based on image 180 to cluster pixels of image 180. In one implementation, clustering instructions 840 command processor 820 to retrieve image 180 from data storage after that processor 820 has received image 180 via interface 890 and stored image 180 to data storage 880. Clustering instructions 840 may command processor 820 to store a cluster map 882, resulting from the performance of step 210, in data storage 880.

When executed by processor 810, classification instructions 860 control processor 820 to perform step 220 of method 200 according to user input 188. Classification instructions 860 may command processor 820 to retrieve cluster map 882 from data storage 880, to apply step 220 thereto. Classification instructions 860 may command processor 820 to store image segmentation 290, resulting from the performance of step 410, in data storage 880 or, alternatively, output image segmentation 290 via interface 890.

In certain embodiments, interface 890 includes a graphical user interface (GUI) 892, and classification instructions 860 are configured to command processor 820 to display image segmentation 290 thereon for evaluation by a user. If image segmentation 290 is unsatisfactory, the user may modify user input 188 and initiate execution of classification instructions 860, by processor 810, to perform another iteration of step 220.

In an embodiment, clustering instructions 840 are configured to perform step 410 of method 400. In this embodiment, clustering instructions 840 include k-means clustering instructions 842 and re-clustering instructions 850 that, when executed by processor 810, control processor 820 to perform steps 412 and 414, respectively, of method 400. K-means clustering instructions 842 may command processor 820 to retrieve k-means clustering parameters 884 from data storage 880, and perform step 410 according to these parameters. K-means clustering parameters 884 may include parameters K and $w_D$, wherein K is an initial estimate of the number of clusters and $w_D$ is a weight that define a strength relationship between color similarity and location similarity. Parameters K and $w_D$ are discussed in further detail below in reference to FIG. 9. K-means clustering instructions 842 may command processor 820 to store cluster map 882 to data storage 880 after performing step 412 to generate a set of first clusters. Re-clustering instructions 850 may command processor 820 to retrieve, from data storage 880, cluster map 882 as defined by the first clusters generated in step 412 and store a revised cluster map 882 of non-disjoint pixel-clusters to data storage 880 after performing step 414 to generate the non-disjoint pixel-clusters. Re-clustering instructions 850 may include one or both of morphological filter instructions 852 and connected-component-analysis instructions 854 (connected components are non-disjoint pixel clusters which are analyzed and "connected" with re-clustering), discussed in further detail below in reference to FIG. 11.

In an embodiment, classification instructions 860 are configured to perform step 620 of method 600. In this embodiment, classification instructions 860 include graph setup instructions 862, graph initialization instructions 864, and graph cutting instructions 866 that, when executed by processor 810, command processor 820 to perform steps 622, 624, and 628, respectively of method 600. Graph setup instructions 862 may command processor 820 to retrieve cluster map 882 from data storage 880 and, after performing step 622, store a resulting graph 885 to data storage 880. Graph initialization instructions 864 may command processor 820 to retrieve graph 885 (or, alternatively, cluster map 882) and user input 188 from data storage and, after performing step 712 based on user input 188 and graph 885 (or cluster map 882), store graph connection weights 888 to data storage 880. Graph cutting instructions 866 may command processor 820 to retrieve graph 885 and graph connection weights 888 from data storage 880 and, after performing step 628, store a resulting image segmentation 290 to data storage 880. Graph cutting instructions 866 may further utilize graph cutting parameters 886, stored in data storage 880, and perform the graph cutting according to these parameters.

One or more of graph setup instructions 862, graph initialization instructions 864, and graph cutting instructions 866 may further utilize graph parameters 886 stored in data storage 880. In one example, graph setup instructions 862 utilize a parameter $R_s^{GC}$ that defines the size of the neighborhood of step 412 (e.g., the size of neighborhood 720 of FIG. 7A). In another example, graph initialization instructions 864 utilize a parameter $\omega_0$ that helps define the strength relationship between (a) node-to-terminal connections (e.g., node-to-terminal connections 740(1) and 740(2)) and (b) node-to-node connections (e.g., node-to-node connections 770) and, if included in the graph, temporal connections (e.g., temporal connections 780).

Certain implementations of instructions 830 may include GUI instructions 870 that, when executed by processor 810, display GUI 892 on a display such that a user may indicate, on GUI 892, classification of certain non-disjoint pixel-clusters or image locations in a plurality of categories. GUI instructions 870 may command processor 820 to generate (a) an image panel for displaying image 180 optionally with cluster map 882 overlaid thereon, and (b) controls that allows a user to point to image locations depicted in the image panel (or point to clusters if cluster map 882 is displayed) to classify each such image location (or cluster) in a selected category. GUI instructions 870 may further command the processor to, after execution of classification instructions 860, display the image with a classification map overlaid thereon. The classification map indicates spatial segmentation between the categories as defined by image segmentation 290, for example in a manner similar to that shown in FIG. 3C.

Figure 9:
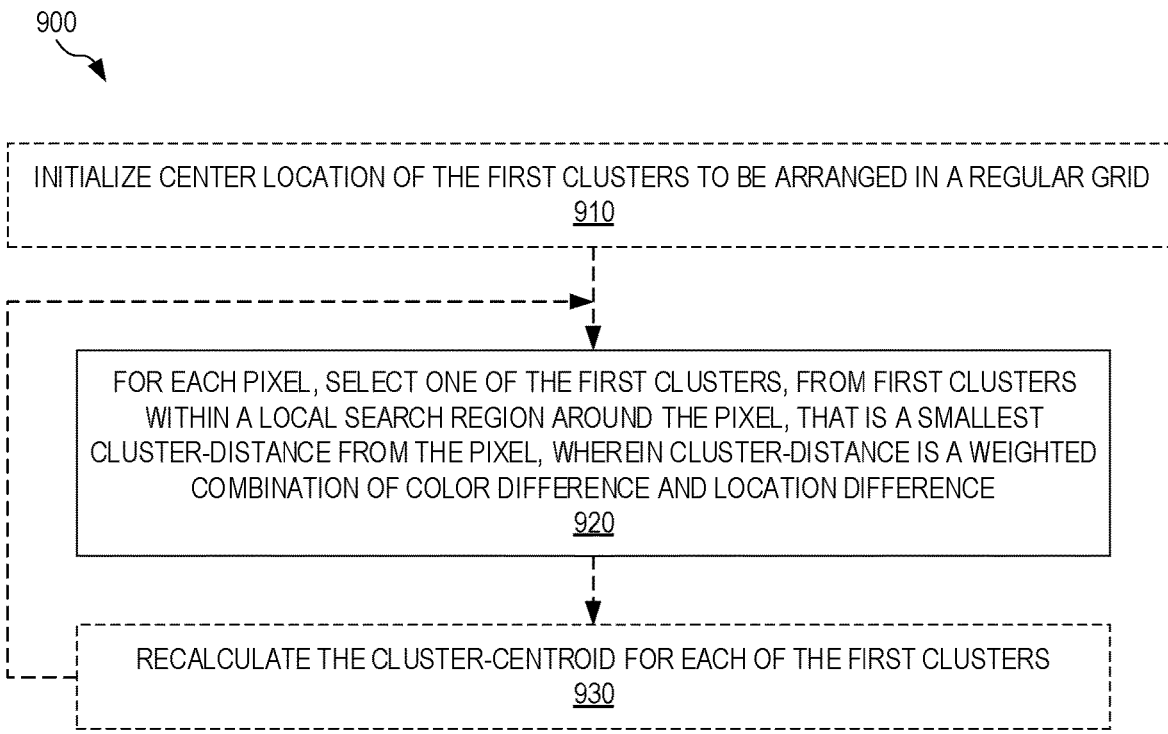
FIG. 9 illustrates a k-means based clustering method for assigning each pixel of an image to one of a plurality of first clusters according to color and location of the pixel, according to an embodiment.
Figure 10:
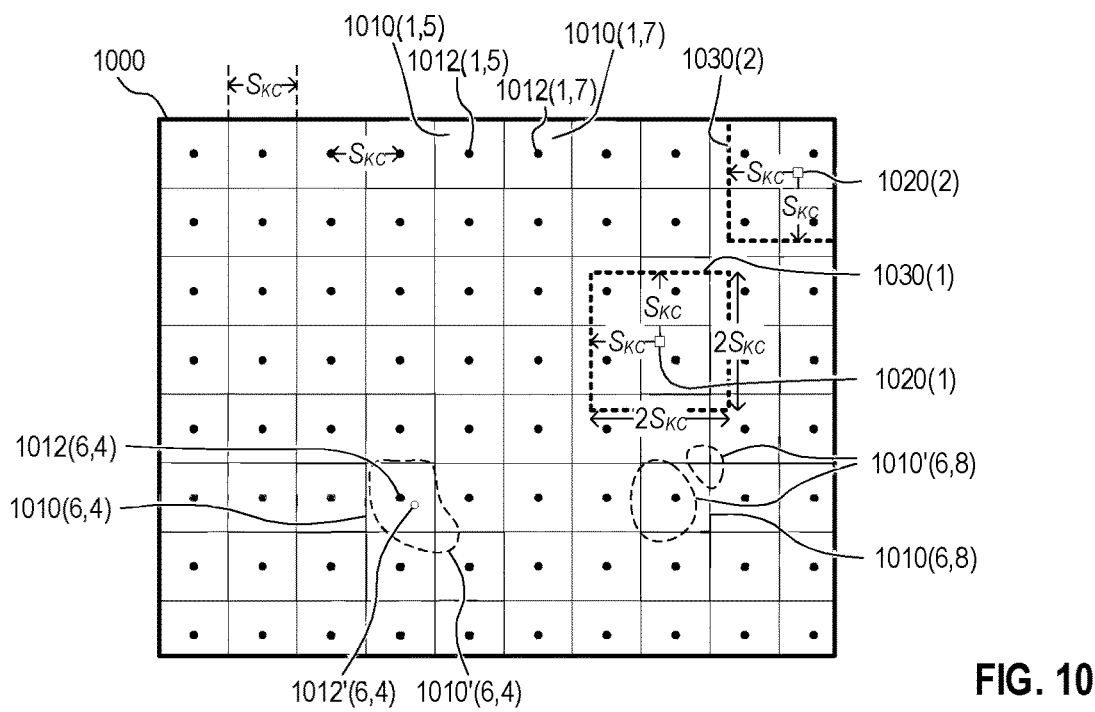
FIG. 10 shows an example that illustrates certain aspects of the method of FIG. 9.

FIG. 9 illustrates one k-means based clustering method 900 for assigning each pixel of an image to one of a plurality of first clusters according to color and location of the pixel. Method 900 is an embodiment of step 412 of method 400. Method 900 may be encoded in k-means clustering instructions 842 and generate cluster map 882. FIG. 10 shows an example that illustrates certain aspects of method 900. FIGS. 9 and 10 are best viewed together in the following description.

Method 900 includes a step 920 that assigns each pixel of the image to a particular one of a set of first clusters. For each pixel, step 920 searches a local search region around the pixel and selects the first cluster that is a smallest "cluster-distance" from the pixel. Herein, a "local search region around a pixel" refers to a region of the image that is around the pixel while being smaller than the full image. For example, a local search region around a pixel may be limited to a certain distance from the pixel. The cluster-distance is a weighted combination of (a) color difference between the pixel and the first cluster and (b) location difference between the pixel and the first cluster. Step 920 then assigns the pixel to the selected first cluster. The search region may be a square region centered at the pixel under consideration. Step 920 may be preceded by a step 910 that initializes center locations of the first clusters to be arranged in a regular grid.

In an embodiment, the cluster-distance between a p'th pixel and an l'th first cluster is calculated as $$D_{KC}^{\{p,l\}} = D_{color}^{\{p,l\}} + w_{KC}^d \left( \frac{D_{XY}^{\{p,l\}}}{S_{KC}} \right),$$

wherein $D_{color}^{\{p,l\}}$ is the $\ell_2$-norm of the color difference between the p'th pixel and the l'th first cluster, $D_{XY}^{\{p,l\}}$ is the $\ell_2$-norm of the location difference between the p'th pixel and the center location of the l'th first cluster, $S_{KC}$ is a characteristic center-to-center distance for adjacent first clusters, and $w_{KC}^d$ is a weight. $w_{KC}^d$ is an example of the parameter $w_D$, discussed above in reference to FIG. 8. $S_{KC}$ may be derived from, or define, the parameter K discussed above in reference to FIG. 8. $D_{XY}^{\{p,l\}}$ may be calculated as $$D_{XY}^{\{p,l\}} = \sqrt{(\bar{x}_{(l)} - x_p)^2 + (\bar{y}_{(l)} - y_p)^2},$$

wherein $\bar{x}_{(l)}$ and $\bar{y}_{(l)}$ are the average horizontal and vertical coordinates, respectively, of the l'th first cluster, and $x_p$ and $y_p$ are the horizontal and vertical coordinates, respectively, of the p'th pixel. $D_{color}^{\{p,l\}}$ may be calculated as $$D_{color}^{\{p,l\}} = \sqrt{\sum_i (\bar{I}_{(l)}^{(i)} - I_p^{(i)})^2},$$

wherein $\bar{I}_{(l)}^{(i)}$ is the value of the normalized i'th color channel averaged over the l'th first cluster, and $I_{(p)}^{(i)}$ is the value of the normalized i'th color channel of the p'th pixel. Normalized color channels are discussed above in reference to FIG. 4. Alternatively, $D_{color}^{\{p,l\}}$ may be based on un-normalized color channel values. The location and normalized color of the p'th pixel may be combined in a centroid $\Gamma_p = (I_{(p)}^{(1)}, I_{(p)}^{(2)}, I_{(p)}^{(3)}, x_p, y_p)$, assuming that there are three color channels. It is understood that the number of color channels may be different, for example four. The average location and normalized color of the l'th first cluster may be combined in a cluster centroid $\Gamma_{(l)} = (\bar{I}_{(l)}^{(1)}, \bar{I}_{(l)}^{(2)}, \bar{I}_{(l)}^{(3)}, \bar{x}_{(l)}, \bar{y}_{(l)})$, again assuming that there are three color channels.

FIG. 10 shows one example of steps 910 and 920. In this example, a set of first clusters 1010(i,j) have been initialized, in step 910, such that their respective center locations 1012(i,j) are on a regular grid relative to an image 1000. Coordinates (i,j) indicate row and column numbers of the grid. For clarity of illustration, not all first clusters 1010 and not all center locations 1012 are labeled in FIG. 10. It is understood that cluster initialization does not require fully specifying the extent of each cluster 1010. It is sufficient to initialize the center locations 1012 of clusters 1010. The distance between adjacent center locations 1012 is $S_{KC}$, such that each first cluster 1010 initially has side length $S_{KC}$, except possibly for first clusters 1010 at the perimeter of image 1000 in situations where an image side length is not divisible by $S_{KC}$. Step 920 considers each pixel 1020 of image 1000. Only two pixels 1020(1) and 1020(2) are explicitly indicated in FIG. 10. For each pixel 1020, step 920 searches a search region 1030 around the pixel. Search region 1030 is centered on pixel 1020 and is, in this example, a square with a side length $2S_{KC}$. For pixels 1020 near the perimeter of image 1000, such as pixel 1020(2), search region 1030 may be truncated. When step 920 has assigned all pixels 1020 of image 1000 to a first cluster 1010 the outlines of first clusters 1010 are most likely different from those of the initial first clusters. For example, after completion of step 920, first cluster 1010 (6,4) may have changed to a modified shape 1010'(6,4), and its center location 1012(6,4) may have shifted to a new center location 1012'(6,4). In another example, after completion of step 920, first cluster 1010(6,8) has changed to be in the shape of two separated areas 1010'(6,8).

Method 900 may further include a step 930 that recalculates the cluster-centroid for each of the first clusters, as modified by step 920. In one example, step 930 recalculates the cluster centroid for each cluster 1010'(i,j) as modified by step 920. In certain embodiments, method 900 performs two or more iterations of steps 920 and 930. In one such embodiment, method 900 is configured to perform a fixed number of iterations, for example between four and 15 iterations. In another such embodiment, method 900 keeps reiterating steps 920 and 930 until the number of pixel assignment changes in step 920 drops below a threshold number.

Figure 11:
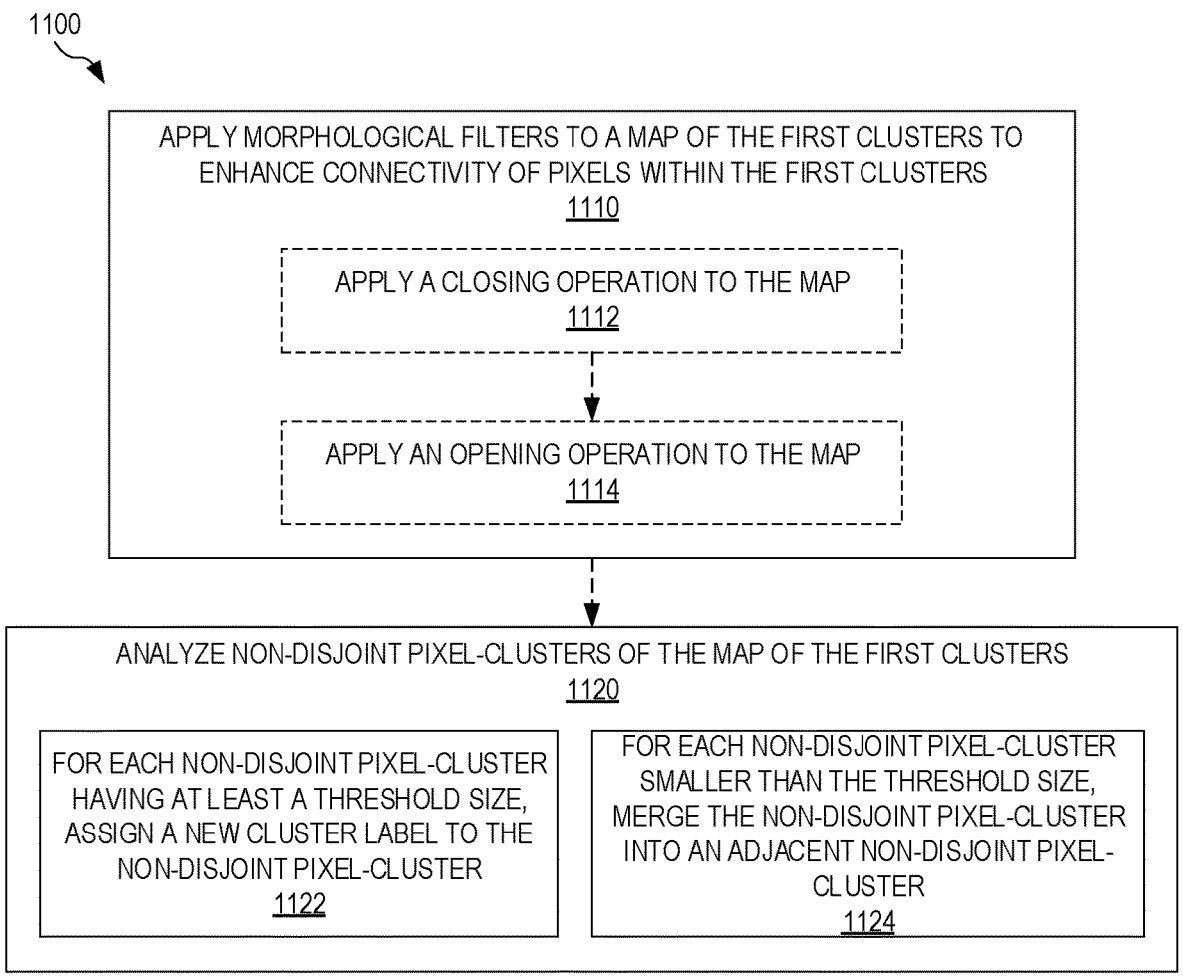
FIG. 11 illustrates a method for re-clustering a plurality of first clusters into a plurality of non-disjoint pixel-clusters, according to an embodiment.
Figure 12:
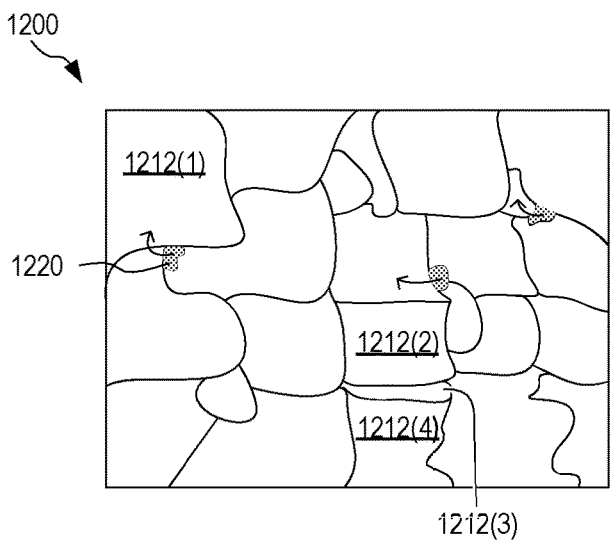
FIG. 12 is an example that illustrates certain aspects of the method of FIG. 11.

FIG. 11 illustrates one method 1100 for re-clustering a plurality of first clusters into a plurality of non-disjoint pixel-clusters. Method 1100 is an embodiment of step 414. Method 1100 may be encoded in re-clustering instructions 850. FIG. 12 is an example that illustrates certain aspects of method 1100. FIGS. 11 and 12 are best viewed together in the following description.

Method 1100 includes steps 1110 and 1120. Step 1110 applies morphological filters to a map of the first clusters to enhance the connectivity of pixels within the first clusters. In one embodiment, step 1110 first applies a closing operation to the map in a step 1112, and then applies an opening operation to the map in a step 1114. Step 1112 may help fill in holes or small gaps in larger clusters. Step 1114 may help remove very small clusters or cluster portions. In one example of step 1110, a closing operation and an opening operation are applied to cluster map 882.

Step 1120 analyzes non-disjoint pixel-clusters of the map of the first clusters, as processed by step 1110. A first cluster of this map may or may not be a non-disjoint pixel-cluster. For example, a first cluster may be composed of two or more disjoint clusters that are not connected to each other. Step 1120 does not merely consider the first clusters of the map. Instead, step 1120 considers the non-disjoint pixel-clusters of the map. Step 1120 re-clusters only non-disjoint pixel-clusters of the first clusters of the map. Since re-clustering involves analyzing only non-disjoint pixel-clusters, computational efforts are reduced compared to conventional segmentation methods. Step 1120 may include steps 1122 and 1124. For each non-disjoint pixel-cluster, in the map of the first clusters, having at least a threshold size (i.e., containing at least a threshold number of pixels), step 1122 assigns a new cluster label to the non-disjoint pixel-cluster. Step 1122 thus serves to keep each such non-disjoint pixel-cluster in the cluster map.

FIG. 12 shows an example cluster map 1200, as having been processed by step 1110. Cluster map 1200 is composed of (a) non-disjoint pixel-clusters 1212 that are at least of the threshold size and (b) non-disjoint pixel-clusters 1220 that are smaller than the threshold size. For clarity of illustration, not all non-disjoint pixel-clusters 1212 and 1220 are labeled in FIG. 12. Instead, non-disjoint pixel-clusters 1212 are white, and non-disjoint pixel-clusters 1220 are grey. Some of non-disjoint pixel-clusters 1212 may belong to the same first cluster. For example, non-disjoint pixel-clusters 1212(2) and 1212(4) may belong to the same first cluster while being separated from each other by a non-disjoint pixel-cluster 1212(3) that constitutes its own first cluster. Step 1122 assigns a new cluster label to each non-disjoint pixel-cluster 1212, regardless of whether or not this non-disjoint pixel-cluster 1212 constituted its own first cluster.

For each non-disjoint pixel-cluster smaller than the threshold size, step 1124 merges the non-disjoint pixel-cluster into an adjacent non-disjoint pixel-cluster. For example, each non-disjoint pixel-cluster 1220 in FIG. 12 is merged into an adjacent non-disjoint pixel-cluster 1212. Step 1124 may be configured to abide to a particular merging direction. For example, step 1124 may raster through all non-disjoint pixel-clusters in a certain pattern (e.g., start at the upper left corner and scan right until reaching the right edge, then start at the left again directly beneath the previous pass, etc.) and merge each non-disjoint pixel-cluster that is smaller than the threshold into the most recent non-disjoint pixel-cluster, in the raster scan, that is at least of the threshold size. When method 1100 is completed, each new cluster label defines a respective non-disjoint pixel-cluster, and this set of non-disjoint pixel-clusters forms a new cluster map for the image.

Step 1110 may be encoded in morphological filter instructions 852, and step 1120 may be encoded in connected-non-disjoint pixel cluster-analysis instructions 854. Method 1100 may be configured to refine cluster map 882.

Figure 16A:
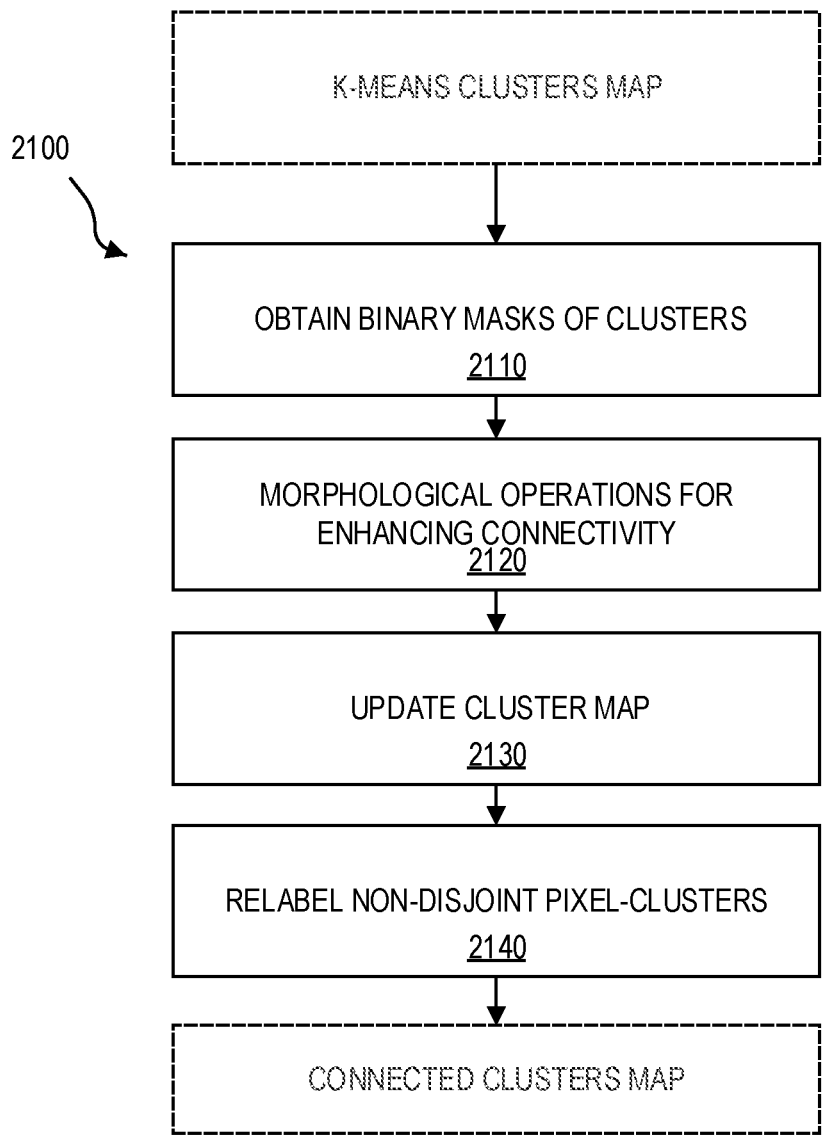
FIG. 16A illustrates further details of the method of re-clustering a plurality of first clusters into a plurality of non-disjoint pixel-clusters illustrated in FIG. 11, according to an embodiment.
Figure 16B:
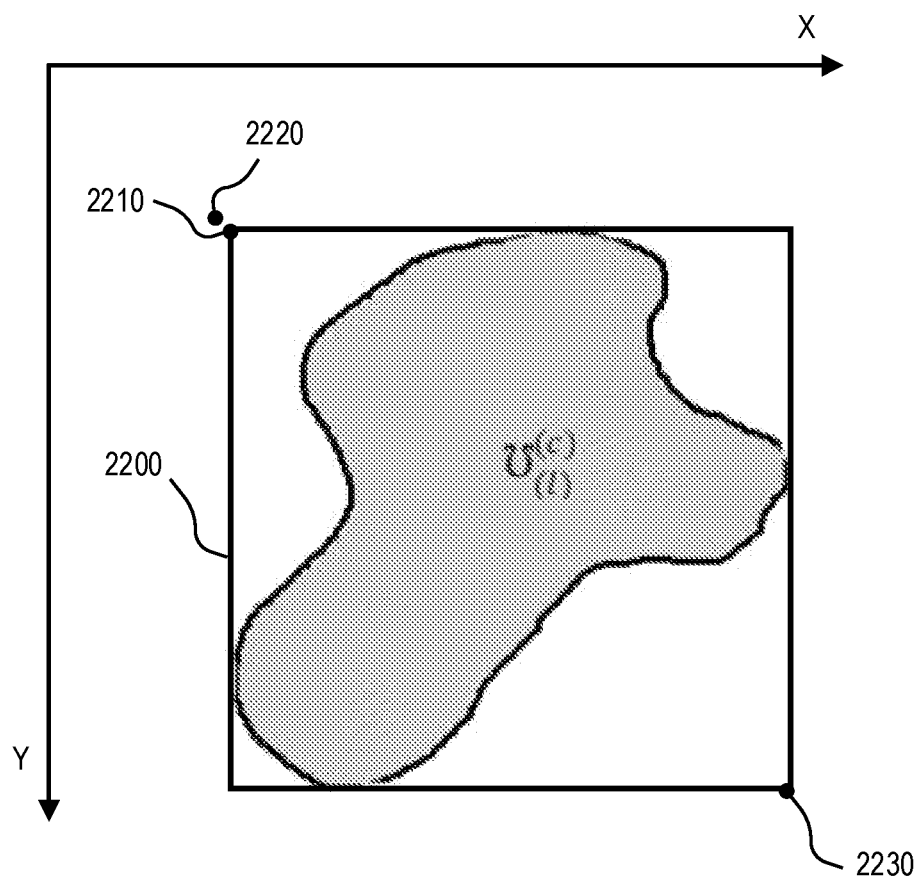
FIG. 16B is an example that illustrates certain aspects of the method of FIG. 16A.

FIG. 16A illustrates a method 2100 of re-clustering a plurality of first clusters into a plurality of non-disjoint pixel-clusters. Method 2100 is an embodiment of step 414. Method 2100 shows further details of method 1100 of FIG. 11. Method 2100 may be encoded in re-clustering instructions 850. FIG. 16B illustrates some aspects of the method of FIG. 16A. FIGS. 16A and 16B are best viewed together in the following description.

In step 2110 a binary mask for each cluster derived from the K-means clustering is obtained. This is done to process each cluster separately using morphological operations in subsequent step 2120. Let $M_{KC}^{(l)}(x_p, y_p)$ be the mask of label $l=1, 2, \ldots L_{KC}$ from the previous clustering step (K-means clusters map). Thus, $$M_{KC}^{(l)}(x_p, y_p) = \begin{cases} 1 & \text{if } L_{KC}^{map}(x_p, y_p) = l \\ 0 & \text{otherwise} \end{cases}$$

In step 2120, morphological filters are applied on $M_{KC}^{(l)}(i,j)$ to get rid of small discontinuities. In a non-limiting example, the closing operation of step 1112 of FIG. 11 uses the imclose operation of MATLAB with square object. In a non-limiting example, step 1114 of FIG. 11 may use the "imopen" function of MATLAB to perform opening operation to the map with the same square object. For each label $l$, the morphed mask $$M_{KC}^{(l),\mathcal{M}}$$

is obtained:

$$M_{KC}^{(l),\mathcal{M}} \leftarrow imopen(imclose(M_{KC}^{(l)}, O_{morph}), O_{morph}),$$

where $O_{morph}$ may be, e.g. a square, structural element. In an example, 5×5 square structural elements for HD images (1920×1080 pixels) may be used (see Table 1 below). In step 2130, the cluster map is updated. Let $L_{KC}^{map,\mathbb{C}}$ be the new updated cluster-lapel map after morphological operations:

$$L_{KC}^{map,\mathbb{C}}(x_p, y_p) = \begin{cases} 1 & \text{if } M_{KC}^{(0),\mathcal{M}}(x_p, y_p) = 1 \\ 0 & \text{otherwise} \end{cases}$$

Due to these operations, a new label 0 is introduced. Thus, the mask $M_{KC}^{(0),CC}$ is derived as:

$$M_{KC}^{(0),\mathcal{M}}(x_p, y_p) = \begin{cases} 1 & \text{if } (L_{KC}^{map,\mathbb{C}}(x_p, y_p) = 0) \\ 0 & \text{otherwise} \end{cases}$$

Each label l=0, 1, 2, ... $L_{KC}$, in $L_{KC}^{map,c}$ is composed of several non-disjoint pixel clusters. In order to have connected regions, in step 2140 a new label for each non-disjoint pixel cluster may be introduced. Alternatively, in step 2140 smaller non-disjoint pixel clusters may be merged to the close-by regions. For example, a raster scan may be performed through all non-disjoint pixel clusters of the updated cluster map. Each non-disjoint pixel cluster that is smaller than a threshold number of pixels may be merged into the most recent non-disjoint cluster, in the raster scan, that has at least the threshold number of pixels. In an example, the bwlabel function in MATLAB may be used to find non-disjoint pixel-cluster mask for each label. For each label, several connected non-disjoint pixel clusters may be obtained, each specified by an index.

Let $\mathbb{C}^{(l)}$ be the map of non-disjoint pixel clusters for l'th region, such that $\mathbb{C}^{(l)}(x_p, y_p)$ represent non-disjoint pixel cluster index at pixel $(x_p, y_p)$ for l'th region. There can be one or many such non-disjoint pixel clusters in one region indexed as c=1, 2, 3 ... $N_{c\,(l)}$, where $N_{c\,(l)}$ is the number of non-disjoint pixel clusters in the l'th region. So, we have $\mathbb{C}^{(l)}(x_p, y_p) = c$.

Let the c'th non-disjoint pixel cluster of l'th region be $\upsilon_{(l)}^{(c)}$. Let $\upsilon_{(l)}^{(c)}$ contain $n_{c(l)}^{(c)}$ pixels. For example, a l=4 region can have total $N_c^{(4)}=5$ non-disjoint pixel-clusters within it. Each of these five non-disjoint pixel-clusters c=1, 2, ..., 5 will be called as $\upsilon_{(4)}^{(1)}, \upsilon_{(4)}^{(2)}, \ldots, \upsilon_{(4)}^{(5)}$ respectively and contains $n_{c(l)}^{(1)}, n_{c(l)}^{(2)}, \ldots, n_{c(l)}^{(5)}$ number of connected pixels. Let $x_{(l)}^{(c),min}$, $x_{(l)}^{(c),max}$ be the minimum and maximum X-coordinates of $\upsilon_{(l)}^{(c)}$. Let $y_{(l)}^{(c),min}$, $y_{(l)}^{(c),max}$ be the minimum and maximum Y-coordinates of $\upsilon_{(l)}^{(c)}$.

$[X_{(l)}^{min}, Y_{(l)}^{min}] = [x_{(l)}^{(c),min}, y_{(l)}^{(c),min}]_{c=1,2,\ldots,N_c}$ $[X_{(l)}^{max}, Y_{(l)}^{max}] = [x_{(l)}^{(c),max}, y_{(l)}^{(c),max}]_{c=1,2,\ldots,N_c}$ Let 'bwlabel' be a function that gives out the non-disjoint pixel-cluster map with its min/max properties. The 'bwlabel' function used in this example has a 4-point connectivity neighborhood to get connected non-disjoint pixel clusters labeled as c=1,2,3, ..., $N_{c\,(l)}$.

$\{\mathbb{C}^{(l)}, N_{c\,(l)}, [X_{(l)}^{min}, Y_{(l)}^{min}], [X_{(l)}^{max}, Y_{(l)}^{max}]\} = \text{bwlabel}(M_{KC}^{(0),\mathcal{M}})$ Thus, $(x_{(l)}^{(c),min}, y_{(l)}^{(c),min})$ is pixel 2210 in the example of FIG. 16B with minimum X- and Y-coordinate from $\upsilon_{(l)}^{(c)}$. Pixel 2210 may or may not belong to $\upsilon_{(l)}^{(c)}$, since we take minimum X and Y-coordinate of $\upsilon_{(l)}^{(c)}$ separately to get the top-left corner of a bounding box 2200 which surrounds $\upsilon_{(l)}^{(c)}$ (see example of FIG. 16B). The bottom right corner of the bounding box 2200 is then defined by $(x_{(l)}^{(c)max}, y_{(l)}^{(c)max})$ pixel, i.e. pixel 2230 in the example of FIG. 16B.

If there are more than one non-disjoint pixel-clusters in a region i.e. $N_{c\,(l)}>1$ (just like the example above with $N_{c\,(4)}=5$), each "sizable" non-disjoint pixel cluster may be assigned a separate label. Whether a non-disjoint pixel cluster is sizable or not may be determined by a simple threshold $T_{KC}$ on the number of pixels in that non-disjoint pixel clusters. If $n_{c(l)}^{(c)}<T_{KC}$, that corresponding $\Omega_{(l)}^{(c)}$ may be too small to be considered. A typical value of $T_{KC}$ may be 50 to 100 pixels but other threshold values may also be used, e.g. lower than 50 pixels or higher than 100 pixels. Such smaller non-disjoint pixel cluster may be merged to a nearby non-disjoint pixel clusters. For example, such smaller non-disjoint pixel clusters may be merged to the non-disjoint pixel clusters at the top-left location as a convention. If $(x_{(l)}^{(c),min}, y_{(l)}^{(c),min})=(0,0)$, a separate label may simply be assigned. If $(x_{(l)}^{(c),min}, y_{(l)}^{(c),min})\neq(0,0)$, the non-disjoint pixel clusters cluster is assigned its top-left neighbor's label. Let $(x_{(l)}^{(c)TL}, y_{(l)}^{(c),TL})$ be the top-left, respective to the bounding box 2200 of $\upsilon_{(l)}^{(c)}$, neighboring pixel 2220. Note that the pixel $(x_{(l)}^{(c)TL}, y_{(l)}^{(c),TL})$, 2220 belongs to a different non-disjoint pixel clusters and it is not part of $\upsilon_{(l)}^{(c)}$. This non-disjoint pixel cluster may be equal to (0,0). Pixel $(x_{(l)}^{(c)TL}, y_{(l)}^{(c),TL})$ may be computed based on:

$(x_{(l)}^{(c)TL}, y_{(l)}^{(c),TL}) = (\max\{(x_{(c),min}^{(l)}-1),0\}, \max\{(y_{(l)}^{(c),min}-1),0\})$ Based on the top-left neighboring pixel of the bounding box 2200 of $\upsilon_{(l)}^{(c)}$, the entire small non-disjoint pixel cluster may be merged to its top-left neighbor. Considering the small number of pixels in the non-disjoint pixel cluster, the bounding box 2200 may be a practical and reasonable assumption. Since relatively small non-disjoint pixel clusters are not analyzed but just merged to a nearby larger non-disjoint pixel clusters, computational resources are considerably reduced. Thus, $L_{KC}^{map,c}(x_p,y_p) = L_{KC}^{map,c}(x_{(l)}^{(c)TL}, y_{(l)}^{(c)TL}) \forall \{(x_p,y_p): \mathbb{C}^{(l)}(x_p, y_p)=c, \text{ where } n_{c(l)}^{(c)}<T_{KC}\}$ Sizable non-disjoint pixel clusters (e.g., with more pixels than $T_{KC}$) may be considered large enough so that a new label for each pixel in that non-disjoint pixel cluster may be introduced.

$L_{KC}^{map,c}(x_p,y_p) = nl$ for all $\{(x_p,y_p): \mathbb{C}^{(l)}(x_p,y_p)=c,$ where $n_{c(l)}^{(c)} \geq T_{KC}\}$ Here, nl is the new label added to the map. The counter nl is incremented as the new labels are added to the map. Note that the labeled may be reassigned due to non-disjoint pixel-cluster analysis. Let $L'_{KC}$ be the new number of labels.

The following Table 1 includes pseudo-code which summarizes the label analysis algorithm. Note that applying morphological operations 2120 and non-disjoint pixel-clusters analysis 2140 may be combined into one function and in one-loop. Alternatively, steps 2120 and 2140 may be performed by separate self-contained functions. There can be multiple alternative ways to use/reuse $L_{KC}^{map,c}$, $M_{KC}^{(\cdot)}, M_{KC}^{(\cdot),\mathcal{M}}$ 2D arrays. It depends on space/coding complexity vs time. In Table 1 temporary masks are used: $M_{KC}^{(Temp)}, M_{KC}^{(Temp),\mathcal{M}}$.

An example implementation is given below in Table 1 where a space-constrained implementation is used.

TABLE 1

Connectivity analysis

```
// Label analysis algorithm to get connected regions
Input: L_KC^map
Set minimum pixels in region threshold value T_KC
Initialize L_KC^{map,C}, M_KC^{(temp)}, M_KC^{(temp),M} zero-arrays of size W × H
// set the morphological analysis object [7]
O_morph = (5 × 5) square    // for HD image
// Get the binary masks from L_KC^map for l = 1,2, ... , L_KC & do morphological processing
for (l = 1; l ≤ L_KC; l + +) {
    for (x_p = 0; x_p < W; x_p + +) {
        for (y_p = 0; y_p < H; y_p + +) {
            l = L_KC^map(x_p, y_p)    // get label l
            M_KC^(temp)(x_p, y_p) = 1    // assign binary mask
        }
    }
    M_KC^{(temp),M} ← imopen (imclose( M_KC^{(l)}, O_morph), O_morph) // apply open and close
    for (x_p = 0; x_p < W; x_p + +) {
        for (y_p = 0; y_p < H; y_p + +) {
            if M_KC^{(temp),M} (x_p, y_p) = 1
                L_KC^map(x_p, y_p) = l    // reassign label l
        }
    }
} // all labels reassigned
// Now, L_KC^map contains labels l = 0,1,2, ... , L_KC
// Non-disjoint pixel-cluster analysis (using MATLAB function)
nl = 1    // new label count
for (l = 0; l ≤ L_KC; l + +) {
    for (x_p = 0; x_p < W; x_p + +) {
        for (y_p = 0; y_p < H; y_p + +) {
            if (L_KC^map(x_p, y_p) == l)
                M_KC^{(temp),M} (x_p, y_p) = 1    // assign binary mask
        }
    }
    // get the non-disjoint pixel-cluster C^{(l)}, N_{C(l)} and n_{c,b}^{(c)} for each l
    { C^{(l)}, NC_{(l)}, [X_{(l)}^min, Y_{(l)}^min], [X_{(l)}^max, Y_{(l)}^max]} = bwlabel (M_KC^{(temp),M})
    // check for all the non-disjoint pixel-clusters
    for (c = 1, c ≤ N_{C(l)}, c + +){
        // small non-disjoint pixel-cluster and its top-left neighbor exists
        if ( n_{c,b}^{(c)} < T_KC) && ((x_{(l)}^{(c),min}, y_{(l)}^{(c),min})! = (0,0) ) {
            // small non-disjoint pixel-cluster: merge to the label for the value outside top
left    (x_{(l)}^{(c),TL}, y_{(l)}^{(c),TL}) = (max {(x_{(l)}^{(c),min} −
1), 0}, max{(y_{(l)}^{(c),min} − 1), 0})
            for (x_p = x_{(l)}^{(c),min}; x_p ≤ x_{(l)}^{(c),max}; x_p + +) {
                for (y_p = y_{(l)}^{(c),min}; y_p ≤ y_{(l)}^{(c),max}; y_p + +) {
                    if ( C^{(l)}(x_p, y_p) == c)
                        L_KC^{map,C} (x_p, y_p) = L_KC^{map,C} (x_{(l)}^{(c),TL}, y_{(l)}^{(c),TL})
                }
            }
        }
        else { // introduce new label to the non-disjoint pixel-cluster inside l'th region
            for (x_p = x_{(l)}^{(c),min}; x_p ≤ x_{(l)}^{(c),max}; x_p + +) {
                for (y_p = y_{(l)}^{(c),min}; y_p ≤ y_{(l)}^{(c),max}; y_p + +) {
                    if ( C^{(l)}(x_p, y_p) == c)
                        L_KC^{map,C} (x_p, y_p) = nl
                }
            }
            nl + +    // increment label for next non-disjoint pixel cluster
        }
    } // all components done
} // all clusters done
L_K^C = nl − 1
Outputs L_KC^{map,C}, L_K^C
```

Figure 13:
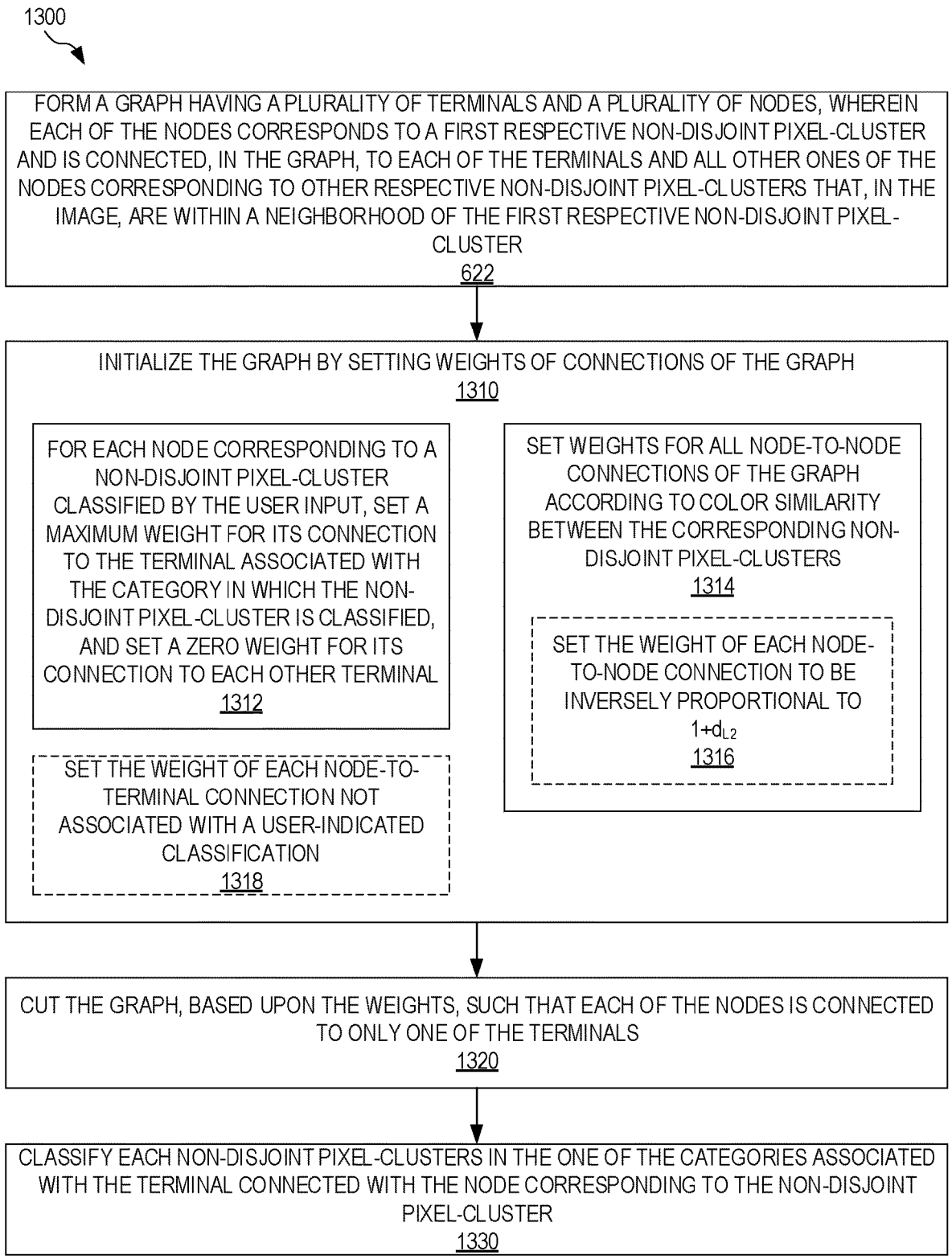
FIG. 13 illustrates a graph-cutting method for classifying each of a plurality of image regions in one of a plurality of categories, according to a user-indicated classification of a proper subset of the regions in the categories, according to an embodiment.
Figure 14A:
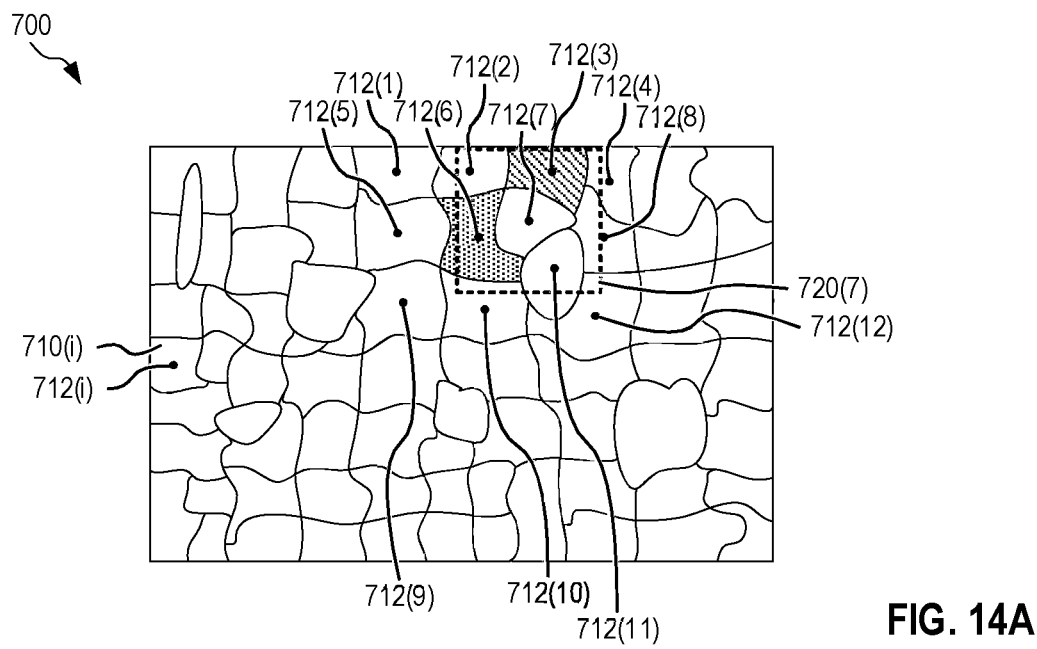
FIGS. 14A and 14B are examples that illustrate certain aspects of the method of FIG. 13.
Figure 14B:
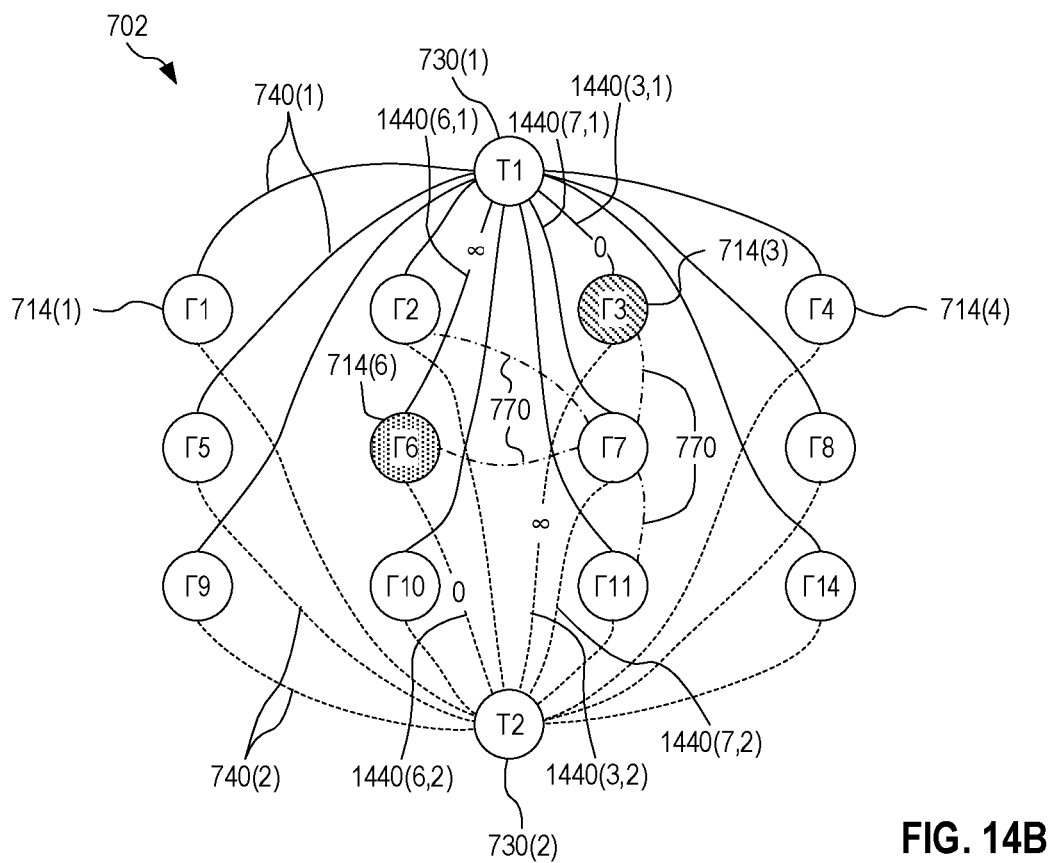

FIG. 13 illustrates one graph-cutting method 1300 for classifying each of a plurality of non-disjoint pixel-clusters in one of a plurality of categories, according to a user-indicated classification of a proper subset of the non-disjoint pixel-clusters in the categories. Method 1300 is an embodiment of step 620 of method 600. Method 1300 may be encoded in classification instructions 860. FIGS. 14A and 14B are examples that illustrate certain aspects of method 1300. FIGS. 13, 14A, and 14B are best viewed together in the following description. Method 1300 first performs step 622 of method 600 to form a graph, and then proceeds to perform steps 1310, 1320, and 1330.

Step 1310 initializes the graph, formed in step 622, by setting weights of connections of the graph. Step 1310 is an embodiment of step 712 and includes steps 1312 and 1314. For each node corresponding to a non-disjoint pixel-cluster classified by the user input, step 1312 sets (a) a maximum weight for its connection to the terminal associated with the category in which the non-disjoint pixel-cluster has been classified by the user, and (b) a zero weight for its connection to each other terminal. In one implementation, the maximum weight is infinity, or the largest numerical value that can be handled by the processor performing step 1312.

FIGS. 14A and 14B shows image 700 and graph 702, respectively, and further indicate an example user-indicated classification of non-disjoint pixel-clusters 710(3) and 710(6). In this example, the user has classified (a) non-disjoint pixel-cluster 710(6) in the category associated with terminal T1 and (b) non-disjoint pixel-cluster 710(3) in the category associated with terminal T2. As a result, step 1312 sets (a) a maximum weight for node-to-terminal connection 1440(3,2) from node Γ3 to terminal T2, and (d) a zero weight for node-to-terminal connection 1440(3,1) from node Γ3 to terminal T1, (c) a maximum weight for node-to-terminal connection 1440(6,1) from node Γ6 to terminal T1, and (d) a zero weight for node-to-terminal connection 1440(6,2) from node Γ6 to terminal T2.

Step 1314 sets weights for all node-to-node connections of the graph according to color similarity between the corresponding non-disjoint pixel-clusters. For example, if non-disjoint pixel-cluster 710(7) has color properties more similar to non-disjoint pixel-cluster 710(6) than non-disjoint pixel-cluster 710(3), step 1314 assigns a greater weight to node-to-node connection 770 from node Γ7 to node Γ6 than to node-to-node connection 770 from node Γ7 to node Γ3. Step 1314 may estimate color similarity based on a color distance between the n'th node and the p'th node calculated as:

$$d_{l2} = \sqrt{\sum_i (\overline{I}_{(n)}^{(i)} - \overline{I}_{p}^{(i)})^2},$$

wherein $\overline{I}_{(n)}^{(l)}$ is the value of the normalized i'th color channel of the n'th node, and $\overline{I}_{(p)}^{(l)}$ is the value of the normalized i'th color channel of the p'th node. $d_{l2}$ is the $\ell_2$-norm of color difference between the n'th node and the p'th node.

In one embodiment, step 1314 implements a step 1316 of setting the weight of each node-to-node connection between the n'th node $\Gamma_n$ and the p'th node $\Gamma_p$ to be inversely proportional to $1+d_{l2}$:

$$W_{\Gamma_n \rightarrow \Gamma_p} = \frac{1}{1 + d_{l2}}.$$

Method 1300 may be implemented to collectively process several images of a video stream, in which case the graph formed in step 622 includes temporal connections, as discussed above in reference to FIGS. 6 and 7C. When further taking into account temporal connections, step 1316 is generalized to set the weight of each node-to-node connection and each temporal connection as:

$$W_{\Gamma_{n,\{l\}} \rightarrow \Gamma_{p,\{m\}}} = \frac{1}{1 + d_{l2}},$$

wherein $\Gamma_{n,\{l\}}$ is the l'th node of the n'th frame and $\Gamma_{p,\{m\}}$ is the m'th node of the p'th frame.

In an embodiment, step 1310 further includes a step 1318 that sets weights for each node-to-terminal connection not associated with a user-indicated classification and therefore not addressed in step 1312. For example, in this embodiment, if the user does not classify non-disjoint pixel-cluster 710(7), step 1318 sets weights for node-to-terminal connection 1440(7,1) from node Γ7 to terminal T1 and node-to-terminal connection 1440(7,2) from node Γ7 to terminal T2. Step 1318 sets such weights based upon color similarity between the non-disjoint pixel-cluster under consideration and non-disjoint pixel-clusters classified by the user. Specifically, step 1318 sets a greater weight for the node-to-terminal connection that connects the node to a terminal that, via other node-to-terminal connections, is connected to one or more nodes most similar in color to the node under consideration. In the example of FIGS. 14A and 14B, if non-disjoint pixel-clusters 710(3) and 710(6) are the only non-disjoint pixel-clusters 710 classified by the user, and non-disjoint pixel-cluster 710(7) has color most similar to non-disjoint pixel-cluster 710(6), step 1318 sets a greater weight for node-to-terminal connection 1440(7,1) than for node-to-terminal connection 1440(7,2). More generally, step 1318 may compare the color of a node under consideration with the color of several nodes connected to each terminal of a graph with the maximum weight.

In one implementation, for each terminal, step 1318 (a) finds the user-classified node, connected to this terminal, that is most similar in color to the un-classified node under consideration, (b) calculates the color distance $d_{l2}$ between these two nodes, and (c) sets the weight for the node-to-terminal connection between the terminal and the un-classified node under consideration to be inversely proportional to $1+d_{l2}$.

Step 1320 cuts the graph, according to the weights, such that each node is connected to only one of the terminals. In one example, step 1320 cuts graph 702 such that each node 714 is connected to only one of terminals T1 and T2.

Step 1330 classifies each non-disjoint pixel-cluster in the category associated with the terminal to which the corresponding node is connected. In one example, after cutting of graph 702 in step 1320, node Γ7 is connected only to terminal T1, and step 1330 therefore classifies non-disjoint pixel-cluster 710(7) in the same category as non-disjoint pixel-cluster 710(6) (having been classified by the user).

Step 1310 is an embodiment of step 712 and may be encoded in graph initialization instructions 864 to set graph connection weights 888. Steps 1320 and 1330 together form an embodiment of step 628 and may be encoded in graph cutting instructions 866 to generate image segmentation 290 by cutting graph 885 based upon graph connection weights 888.

Example 1: Clustering of Image into Non-Disjoint Pixel-Clusters

Figure 15A:
FIGS. 15A-C show clustering of an example image.
Figure 15B:
Figure 15C:

FIGS. 15A–C show clustering of image 300 into non-disjoint pixel-clusters according to an embodiment of step 410 of method 400 that implements method 900 in step 412 (with the initial clusters being squares arranged on a regular grid) and method 1100 in step 414. Each of FIGS. 15A-C shows the resulting clustering with a different set of choices for the parameters $w_{KC}^d$ and $K_{KC}^d$. The parameter $K_{KC}$ relates to the parameter $S_{KC}$ through the equation $$s_{KC} = \left\lceil \sqrt{\frac{W \times H}{K_{KC}}} \right\rceil,$$

wherein W and H are the width and height, respectively, of the image. For FIGS. 15A-C, $K_{KC}=128$, and $w_{KC}^d$ equals 0.1, 0.5, and 1.0, respectively.

The effect of $w_{KC}^d$ is to control the trade-off between the color difference and the location difference. As is observed in FIGS. 15A-C, higher value of $w_{KC}^d$ leads to boundaries closer to the original square-window shape. Smaller values of $w_{KC}^d$ give more importance to the color and tends to break the clusters more out of the square-window shape. A typical value of $w_{KC}^d$ in the range from 0.1 to 1.0 shows good results in our experiments. It is further evident from comparing FIGS. 15A-C with FIG. 5B ($K_{KC}$=128, $w_{KC}^d$=1.0) that increasing $K_{KC}$ results in more clusters per frame. The time complexity with respect to $K_{KC}$ is shown in Table 2 in an example where image 300 was processed on a Windows 10 PC with Intel Xeon CPU E5-2637 v3 at 3.5 GHz and 16 GB RAM system running MATLAB R2017b version.

TABLE 2

Average computation time for different values of $K_{KC}$ with $w_{KC}^d$ = 0.1.

| $K_{KC}$ | Avg. computation time (sec.) |
|---|---|
| 128 | 5.00 |
| 512 | 5.49 |
| 2025 | 9.41 |

Combinations of Features

Features described above as well as those claimed below may be combined in various ways without departing from the scope hereof. For example, it will be appreciated that aspects of one image segmentation method or product, described herein, may incorporate or swap features of another image segmentation method or product described herein. The following examples illustrate some possible, non-limiting combinations of embodiments described above. It should be clear that many other changes and modifications may be made to the methods, products, and systems herein without departing from the spirit and scope of this invention:

(A1) One method for image segmentation includes (a) clustering, based upon k-means clustering, pixels of an image into a plurality of first clusters, (b) re-clustering, at least in part by processing connectivity of the pixels within the first clusters, the pixels into a plurality of non-disjoint pixel-clusters such that, within each of the non-disjoint pixel-clusters, any pair of pixels are immediately adjacent each other or connected to each other via one or more other pixels of the non-disjoint pixel-cluster, and (c) classifying each of the non-disjoint pixel-clusters in one of a plurality of categories, according to a user-indicated classification of a proper subset of the non-disjoint pixel-clusters in the categories.

(A2) In the method denoted as (A1), the plurality of categories may consist of a first category and a second category.

(A3) In the method denoted as (A2), the first category may indicate a portion of the image to be in focus, and the second category may indicate a portion of the image to be defocused.

(A4) In the method denoted as (A1), each category may indicate a portion of the image to be displayed with a respective degree of focus.

(A5) In any of the methods denoted as (A1) through (A4), the step of clustering may include assigning each pixel of the image to one of the first clusters according to color and position of the pixel.

(A6) In the method denoted as (A5), the step of assigning may include, for each pixel, selecting, for the step of assigning, the one of the first clusters from first clusters within a local search region around the pixel, wherein the one of the first clusters is located at a smallest cluster-distance from the pixel, and wherein cluster-distance is a weighted combination of color difference and location difference between the pixel and the first clusters.

(A7) In the method denoted as (A6), for each of the first clusters, the cluster-distance may be referenced to a cluster-centroid of the first cluster, wherein the cluster-centroid indicates average location and color of all pixels of the first cluster, and the step of clustering may include iteratively (i) performing the step of assigning for all the pixels and (ii) recalculating the cluster-centroid for each of the first clusters.

(A8) The method denoted as (A7) may further include, prior to a first iteration of the step of assigning, initializing respective center locations of the first clusters to be arranged in a regular grid.

(A9) Any of the methods denoted as (A5) through (A8) may further include, prior to the step of clustering, normalizing each color component of the image according to average and standard deviation of the color component across the image.

(A10) In any of the methods denoted as (A1) through (A9), the step of re-clustering may include applying morphological filters to a map of the first clusters to enhance connectivity of pixels within the first clusters, and, after the step of applying, analyzing non-disjoint pixel-clusters of the map of the first clusters, wherein the step of analyzing includes (i) for each non-disjoint pixel-cluster containing at least a threshold number of pixels, assigning a new cluster label to the non-disjoint pixel-cluster, the new cluster label defining a respective one of the non-disjoint pixel-clusters, and (ii) for each non-disjoint pixel-cluster containing fewer pixels than the threshold number of pixels, merging the non-disjoint pixel-cluster into an adjacent non-disjoint pixel-cluster.

(A11) In the method denoted as (A10), the step of applying may include applying a closing operation to the map and, after applying the closing operation, applying an opening operation to the map.

(A12) In any of the methods denoted as (A1) through (A11), the step of classifying may include (i) for each non-disjoint pixel-cluster in the proper subset, classifying the non-disjoint pixel-cluster in one of the categories based upon a user input, and (ii) after classifying each non-disjoint pixel-cluster of the proper subset, classifying, by graph cutting, remaining ones of the non-disjoint pixel-clusters in the categories.

(A13) In the method denoted as (A12), the step of classifying the remaining ones of the non-disjoint pixel-clusters may include (I) forming a graph wherein each non-disjoint pixel-cluster is connected to (a) a plurality of terminals respectively associated with the plurality of categories, and (b) all other non-disjoint pixel-clusters within a neighborhood of the non-disjoint pixel-cluster, (II) initializing the graph by (a) for each non-disjoint pixel-cluster of the proper subset, setting a maximum weight for its connection to the one terminal associated with the category in which the non-disjoint pixel-cluster is classified, and setting a zero weight for its connection to each other one of the terminals, and (b) for each of the remaining non-disjoint pixel-clusters within the neighborhood, specifying a weight for each of its connections to other non-disjoint pixel-clusters according to color similarity, (III) cutting the graph, based upon the weights defined in the step of initializing, such that each of the non-disjoint pixel-clusters is connected to only one of the terminals, and (IV) after the step of cutting, classifying each non-disjoint pixel-cluster in the category associated with the terminal that connected to the non-disjoint pixel-cluster.

(A14) In the method denoted as (A13), the neighborhood may be a spatial portion of the image centered at the non-disjoint pixel-cluster, wherein the spatial portion is smaller than the image.

(A15) In either of the methods denoted as (A13) and (A14), the image may be part of a video stream, and the method may further include (i) in the step of forming, including temporal connections between each non-disjoint pixel-cluster of the image and each non-disjoint pixel-cluster within a same neighborhood in each of one or more other preceding or subsequent images of the video stream, and (ii) in the step of initializing, specifying a weight of the temporal connections according to color similarity.

(A16) In the method denoted as (A15), the temporal connections may connect to $t_b$ preceding images and $t_a$ subsequent images, wherein $t_a$ and $t_b$ are non-negative integers, $t_b \geq t_a$.

(A17) In any of the methods denoted as (A13) through (A16) in the step of initializing, the weight of each connection to the other non-disjoint pixel-clusters may be inversely proportional to $1+d_{l2}$, wherein $d_{l2}$ is the $\ell_2$-norm of color difference between the non-disjoint pixel-clusters connected by the connection.

(B1) One software product for image segmentation includes computer-readable media storing machine-readable instructions that include (I) clustering instructions that, when executed by a processor, control the processor to (a) cluster, based upon k-means clustering, pixels of an image into a plurality of first clusters and (b) store, to a memory, a k-means-cluster-map of the first clusters, (II) re-clustering instructions that, when executed by the processor, control the processor to (a) retrieve the k-means-cluster-map from memory, (b) process connectivity of pixels within the first clusters of the k-means-cluster-map to re-cluster the pixels into a plurality of non-disjoint pixel-clusters such that all pixels of each of the non-disjoint pixel-clusters are connected to each other, and (c) store, to the memory, a connected-cluster-map of the non-disjoint pixel-clusters, and (III) classification instructions that, when executed by the processor, control the processor to classify each of the non-disjoint pixel-clusters in one of a plurality of categories, according to a user-specified classification of a proper subset of the non-disjoint pixel-clusters in the categories.

(B2) In the software product denoted as (B1), the plurality of categories may consist of a first category and a second category.

(B3) In the software product denoted as (B2), the first category may indicate a portion of the image to be in focus, and the second category may indicate a portion of the image to be defocused.

(B3) In the software product denoted as (B1), each category may indicate a portion of the image to be displayed with a respective degree of focus.

(B4) In any of the software products denoted as (B1) through (B3), the re-clustering instructions may include morphological filter instructions that, when executed by the processor, control the processor to filter the k-means-cluster-map to enhance connectivity of pixels within the first clusters, and connected-component-analysis instructions that, when executed by the processor, control the processor to analyze non-disjoint pixel-clusters of the k-means-cluster-map, as enhanced by execution of the morphological filter instructions, to generate the connected-cluster-map.

(B5) In the software product denoted as (B4), the connected-component-analysis instructions may be configured to, when executed by the processor, control the processor to (i) for each non-disjoint pixel-cluster containing at least a threshold number of pixels, assign a new cluster label to the non-disjoint pixel-cluster, the new cluster label defining a respective one of the non-disjoint pixel-clusters, and (ii) for each non-disjoint pixel-cluster containing fewer pixels than the threshold number of pixels, merge the non-disjoint pixel-cluster into an adjacent non-disjoint pixel-cluster.

(B6) Any of the software products denoted as (B1) through (B5) may further include (IV) user interface instructions that, when executed by the processor, control the processor to generate, on a display, a graphical user interface configured to receive, from a user, an indication of the user-specified classification of the proper subset of the non-disjoint pixel-clusters, and the classification instructions may include graph cutting instructions that, when executed by the processor, control the processor to classify, by graph cutting and based on the indications received from the user via the graphical user interface, remaining ones of the non-disjoint pixel-clusters in the categories.

(B7) In the software product denoted as (B6), the graphical user interface may include an image panel for displaying the image with the connected-cluster-map overlaid thereon, and one or more controls that allow a user to point to one or more of the non-disjoint pixel-clusters depicted in the image panel to classify the one or more of the non-disjoint pixel-clusters in a selected one of the categories.

(B8) In either of the software products denoted as (B6) and (B7), the user interface instructions may further be configured to, when executed by the processor and after classification of all non-disjoint pixel-clusters in the categories, display the image with a classification map overlaid thereon, wherein the classification map indicates spatial segmentation between the categories.

(C1) One method for user-guided image segmentation includes (a) forming a graph having a plurality of terminals and a plurality of nodes, wherein each of the nodes corresponds to a first respective non-disjoint pixel-cluster of the image and is connected, in the graph, to each of the terminals and all other ones of the nodes corresponding to other respective non-disjoint pixel-clusters that, in the image, are within a neighborhood of the first respective non-disjoint pixel-cluster, (b) initializing the graph by setting weights of connections of the graph at least partly according to a user input indicating classification of some but not all of the non-disjoint pixel-clusters in a plurality of categories respectively associated with the plurality of terminals, and (c) segmenting the image into the categories by cutting the graph based upon the weights.

(C2) In the method denoted as (C1), the plurality of categories may consist of a first category and a second category.

(C3) In the method denoted as (C2), the first category may indicate a portion of the image to be in focus, the second category may indicate a portion of the image to be defocused.

(C4) In the method denoted as (C1), each category may indicate a portion of the image to be displayed with a respective degree of focus.

(C5) In any of the methods denoted as (C1) through (C4), the step of initializing may include (i) setting weights for all node-to-node connections of the graph according to color similarity between the corresponding non-disjoint pixel-clusters, and (ii) for each node corresponding to a non-disjoint pixel-cluster classified by the user input, setting a maximum weight for its connection to the terminal associated with the category in which the non-disjoint pixel-cluster is classified, and setting a zero weight for its connection to each other terminal.

(C6) In the method denoted as (C5), in the step of specifying, the weight of each connection to the other non-disjoint pixel-clusters may be inversely proportional to $1+d_{l2}$, wherein $d_{l2}$ is the $\ell_2$-norm of color difference between the non-disjoint pixel-clusters connected by the connection.

(C7) In any of the methods denoted as (C1) through (C6), the step of segmenting may include cutting the graph, based upon the weights, such that each of the nodes is connected to only one of the terminals, and, after the step of cutting, classifying each non-disjoint pixel-cluster in the one of the categories associated with the terminal connected with the node corresponding to the non-disjoint pixel-cluster.

(C8) In any of the methods denoted as (C1) through (C7), the non-disjoint pixel-clusters, corresponding to the nodes, may cooperatively include all pixels of the image.

(C9) In any of the methods denoted as (C1) through (C8), the neighborhood may be a spatial portion of the image centered at the non-disjoint pixel-cluster, wherein the spatial portion is smaller than the image.

(C10) In any of the methods denoted as (C1) through (C9), the image may be part of a video stream, and the method may further include, in the step of forming and for each of the nodes, including temporal connections between the node and each node corresponding to a non-disjoint pixel-cluster within a same neighborhood in each of one or more other preceding or subsequent images of the video stream, and in the step of initializing, setting weights for the node-to-node connections and the temporal connections according to color similarity between the corresponding non-disjoint pixel-clusters.

(C11) In the method denoted as (C10), the temporal connections may connect to $t_b$ preceding images and $t_a$ subsequent images, wherein $t_a$ and $t_b$ are non-negative integers, $t_b \geq t_a$.

(C12) Any of the methods denoted as (C1) through (C11) may further include prior to the step of initializing, displaying the image with a map of the non-disjoint pixel-clusters overlaid thereon, and, after the step of segmenting, displaying the image with a map of the categories overlaid thereon.

(D1) One software product for image segmentation includes computer-readable media storing machine-readable instructions that include (a) graph setup instructions that, when executed by a processor, control the processor to form a graph having a plurality of terminals and a plurality of nodes, wherein each of the nodes corresponds to a respective non-disjoint pixel-cluster of the image and is connected, in the graph, to each of the terminals and all other ones of the nodes corresponding to other respective non-disjoint pixel-clusters that, in the image, are within a neighborhood of the respective non-disjoint pixel-cluster, (b) graph initializing instructions that, when executed by the processor, control the processor to set weights of connections of the graph at least partly according to a user input indicating classification of some but not all of the non-disjoint pixel-clusters in a plurality of categories respectively corresponding to the plurality of terminals, and (c) graph cutting instructions that, when executed by the processor, control the processor to cut the graph based upon the weights so as to segment the image into the categories.

(D2) In the software product denoted as (D1), the plurality of categories may consist of a first category and a second category.

(D3) In the software product denoted as (D2), the first category may indicate a portion of the image to be in focus, and the second category may indicate a portion of the image to be defocused.

(D4) In the software product denoted as (D1), each category may indicate a portion of the image to be displayed with a respective degree of focus.

(D5) In any of the software products denoted as (D1) through (D4), the graph initializing instructions may be configured to, when executed by the processor, control the processor to (i) set weights for all node-to-node connections of the graph according to color similarity between the corresponding non-disjoint pixel-clusters, and (ii) for each node corresponding to a non-disjoint pixel-cluster classified by the user input, set a maximum weight for its connection to the terminal associated with the category in which the non-disjoint pixel-cluster is classified, and set a zero weight for its connection to each other terminal.

(D6) In any of the software products denoted as (D1) through (D5), the graph cutting instructions may be configured to, when executed by the processor, control the processor to (i) cut the graph, based upon the weights, such that each of the nodes is connected to only one of the terminals, and (ii) classify each non-disjoint pixel-cluster in the category associated with the terminal connected to the node corresponding to the non-disjoint pixel-cluster.

(D7) Any of the software products denoted as (D1) through (D6) may further include user interface instructions that, when executed by the processor, control the processor to generate, on a display, a graphical user interface configured to receive, from a user, an indication of the classification of said some but not all of the non-disjoint pixel-clusters.

(D8) In the software product denoted as (D7), the graphical user interface may include an image panel for displaying the image with a map of the non-disjoint pixel-clusters overlaid thereon, and one or more controls that allow a user to point to one or more of the non-disjoint pixel-clusters depicted in the image panel to classify the one or more of the non-disjoint pixel-clusters in a selected one of the categories.

(D9) In the software product denoted as (D8), the user interface instructions may further be configured to, when executed by the processor and after classification of all non-disjoint pixel-clusters in the categories, display the image with a classification map overlaid thereon, the classification map indicating spatial segmentation between categories.

(E1) One software product for image segmentation includes machine-readable instructions that, when the software product is executed by a computer, causes the computer to carry out the method denoted as any one of (A1) through (A17) and (C1) through (C12).

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A method for image segmentation, comprising:
   clustering, based upon k-means clustering, pixels of an image into a plurality of first clusters;
   outputting a cluster map of the first clusters, wherein the cluster map comprises non-disjoint pixel-clusters and disjoint pixel-clusters, wherein, within each of the non-disjoint pixel-clusters, any pair of pixels are immediately adjacent each other or connected to each other via one or more other pixels of the non-disjoint pixel-cluster,
   re-clustering, at least in part by processing connectivity of the pixels within the first clusters, the pixels into a new plurality of non-disjoint pixel-clusters wherein the step of re-clustering re-clusters only the non-disjoint pixel-clusters of the map of the first clusters, wherein said re-clustering comprises assigning new labels only to non-disjoint pixel clusters containing at least a threshold number of pixels, wherein the new label defines a respective one of the non-disjoint pixel cluster of the new plurality of non-disjoint pixel-clusters; and
   classifying each of the non-disjoint pixel-clusters in one of a plurality of categories, according to a user-indicated classification of a proper subset of the non-disjoint pixel-clusters in the categories, wherein $\mathbb{C}^{(l)}$ is the map of non-disjoint pixel clusters for a l region, N$\mathbb{C}_{(l)}$ is the number of non-disjoint pixel clusters in the l'th region, $\upsilon_{(l)}^{(c)}$ is the c'th non-disjoint pixel cluster of l'th region, n$\mathbb{C}_{(l)}^{(c)}$ (c is the number of pixels within the c'th non-disjoint pixel cluster $\upsilon_{(l)}^{(c)}$ (c) and $T_{KC}$ is the threshold number of pixels in c'th non-disjoint pixel cluster, wherein if N$\mathbb{C}_{(l)}$>1 and n$\mathbb{C}_{(l)}^{(c)} \geq T_{KC}$ a new label to the c'th non-disjoint pixel cluster is assigned and if n$\mathbb{C}_{(l)}^{(c)} < T_{KC}$, the c'th non-disjoint pixel cluster is merged with an adjacent non-disjoint pixel cluster.

2. The method of claim 1, wherein said re-clustering comprises:
   performing a raster scan through all non-disjoint pixel clusters of the cluster map in a certain pattern, and
   merging each non-disjoint pixel cluster that is smaller than a threshold number of pixels into the most recent non-disjoint cluster, in the raster scan, that contains at least the threshold number of pixels.

3. The method of claim 2, wherein merging each non-disjoint pixel cluster comprises re-labelling each non-disjoint pixel cluster that is smaller than the threshold with a label of the most recent non-disjoint cluster that contains at least the threshold number of pixels, wherein the label defines a respective one of the non-disjoint pixel clusters.

4. The method of claim 1, wherein for each c'th non-disjoint pixel cluster $\upsilon_{(l)}^{(c)}$ a bounding box is defined surrounding the c'th non-disjoint pixel cluster $\upsilon_{(l)}^{(c)}$ by taking minimum and maximum horizontal and vertical x-y coordinates of the c'th non-disjoint pixel cluster $\upsilon_{(l)}^{(c)}$ in a cartesian coordinate system for representing the image, wherein the adjacent non-disjoint pixel cluster is identified by the pixel computed as:

$$\left(x_{(l)}^{(c),TL}, y_{(l)}^{(c),TL}\right) = \left(\max\{(x_{(l)}^{(c),min} - 1), 0\}, \max\{(y_{(l)}^{(c),min} - 1), 0\}\right)\left(x_{(l)}^{(c),TL}, y_{(l)}^{(c),TL}\right)$$

the horizontal and vertical coordinates of the pixel in the adjacent non-disjoint pixel cluster TL, and wherein $x_{(l)}^{(c),min}$ and $y_{(l)}^{(c),min}$ represent the minimum horizontal and vertical coordinates of the c'th non-disjoint pixel cluster $$\upsilon_{(l)}^{(c)}.$$

5. The method of claim 1, wherein re-clustering further comprises: applying morphological filters to the map of the first clusters to enhance connectivity of pixels within the first clusters, and before applying morphological filters to the map of the first clusters, obtaining a binary mask for each cluster for processing each cluster separately with morphological filters.

6. The method according to claim 5 wherein the step of applying morphological filters comprises applying a closing operation function and an opening operation function for filling pixel gaps in each one of the first clusters and obtaining an updated cluster map of the first clusters.

7. The method of claim 1, wherein the plurality of categories comprises a first category and a second category and wherein the first category indicates a portion of the image to be in focus, and the second category indicates a portion of the image to be defocused.

8. The method of claim 1, the step of clustering comprising assigning each pixel of the image to one of the first clusters according to color and position of the pixel.

9. The method of claim 8, the step of assigning comprising, for each pixel, selecting, for said assigning, the one of the first clusters from first clusters within a local search region around the pixel, the one of the first clusters being located at a smallest cluster-distance from the pixel, wherein cluster-distance is a weighted combination of color difference and location difference between the pixel and the first clusters.

10. The method of claim 9, for each of the first clusters, the cluster-distance being referenced to a cluster-centroid of the first cluster, the cluster-centroid indicating average location and color of all pixels of the first cluster, the step of clustering comprising iteratively:
   performing the step of assigning for all the pixels; and
   recalculating the cluster-centroid for each of the first clusters.

11. The method of claim 8, further comprising, prior to a first iteration of the step of assigning, initializing respective center locations of the first clusters to be arranged in a regular grid.

12. The method of claim 1, further comprising, prior to the step of clustering, normalizing each color component of the image according to average and standard deviation of the color component across the image.

13. The method of claim 1, the step of classifying comprising:
   for each non-disjoint pixel-cluster in the proper subset, classifying the non-disjoint pixel-cluster in one of the categories based upon a user input; and
   after classifying each non-disjoint pixel-cluster of the proper subset, classifying, by graph cutting, remaining ones of the non-disjoint pixel-clusters in the categories.

14. The method of claim 13, the step of classifying the remaining ones of the non-disjoint pixel-clusters comprising:

forming a graph wherein each non-disjoint pixel-cluster is connected to (a) a plurality of terminals respectively associated with the plurality of categories, and (b) all other non-disjoint pixel-clusters within a neighborhood of the non-disjoint pixel-cluster;

initializing the graph by:

for each non-disjoint pixel-cluster of the proper subset, setting a maximum weight for its connection to the one terminal associated with the category in which the non-disjoint pixel-cluster is classified, and setting a zero weight for its connection to each other one of the terminals, and for each of the remaining non-disjoint pixel-clusters within the neighborhood, specifying a weight for each of its connections to other non-disjoint pixel-clusters according to color similarity;

cutting the graph, based upon the weights defined in the step of initializing, such that each of the non-disjoint pixel-clusters is connected to only one of the terminals; and after the step of cutting, classifying each non-disjoint pixel-cluster in the category associated with the terminal that connected to the non-disjoint pixel-cluster.

15. The method of claim 14, the neighborhood being a spatial portion of the image centered at the non-disjoint pixel-cluster, the spatial portion being smaller than the image.

16. The method of claim 14, the image being part of a video stream, the method further comprising:

in the step of forming, including temporal connections between each non-disjoint pixel-cluster of the image and each non-disjoint pixel-cluster within a same neighborhood in each of one or more other preceding or subsequent images of the video stream; and in the step of initializing, specifying a weight of the temporal connections according to color similarity.

17. The method of claim 16, the temporal connections connecting to $t_b$ preceding images and $t_a$ subsequent images, $t_a$ and $t_b$ being non-negative integers, $t_b \geq t_a$.

18. The method of claim 14, in the step of initializing, the weight of each connection to the other non-disjoint pixel-clusters being inversely proportional to $1+d_{l2}$, wherein $d_{l2}$ is the $l_2$-norm of color difference between the non-disjoint pixel-clusters connected by the connection.

19. A method for image segmentation includes (a) forming a graph having a plurality of terminals and a plurality of nodes, wherein each of the nodes corresponds to a first respective non-disjoint pixel-cluster of the image and is connected, in the graph, to each of the terminals and all other ones of the nodes corresponding to other respective non-disjoint pixel-clusters that, in the image, are within a neighborhood of the first respective non-disjoint pixel-cluster, (b) initializing the graph by setting weights of connections of the graph at least partly according to a user input indicating classification of some but not all of the non-disjoint pixel-clusters in a plurality of categories respectively associated with the plurality of terminals, and (c) segmenting the image into the categories by cutting the graph based upon the weights, wherein the step of initializing includes (i) setting weights for all node-to-node connections of the graph according to color similarity between the corresponding non-disjoint pixel-clusters, and (ii) for each node corresponding to a non-disjoint pixel-cluster classified by the user input, setting a maximum weight for its connection to the terminal associated with the category in which the non-disjoint pixel-cluster is classified, and setting a zero weight for its connection to each other terminal, wherein the weight of each connection to the other non-disjoint pixel-clusters is inversely proportional to $1+d_{l2}$, wherein $d_{l2}$ is the $l_2$-norm of color difference between the non-disjoint pixel-clusters connected by the connection.

20. The method of claim 19, the plurality of categories comprises a first category and a second category, wherein the first category indicates a portion of the image to be in focus, the second category indicates a portion of the image to be defocused.

21. The method of claim 19, wherein the step of segmenting includes cutting the graph, based upon the weights, such that each of the nodes is connected to only one of the terminals, and, after the step of cutting, classifying each non-disjoint pixel-cluster in the one of the categories associated with the terminal connected with the node corresponding to the non-disjoint pixel-cluster.

22. The method of claim 19, the non-disjoint pixel-clusters, corresponding to the nodes, cooperatively includes all pixels of the image.

23. The method of claim 19, the neighborhood is a spatial portion of the image centered at the non-disjoint pixel-cluster, wherein the spatial portion is smaller than the image.

24. The method of claim 19, the image is part of a video stream, and the method further includes, in the step of forming and for each of the nodes, including temporal connections between the node and each node corresponding to a non-disjoint pixel-cluster within a same neighborhood in each of one or more other preceding or subsequent images of the video stream, and in the step of initializing, setting weights for the node-to-node connections and the temporal connections according to color similarity between the corresponding non-disjoint pixel-clusters.

25. The method of claim 24, the temporal connections may connect to $t_b$ preceding images and $t_a$ subsequent images, wherein $t_a$ and $t_b$ are non-negative integers, $t_b \geq t_a$.

26. The method of claim 19, further comprising prior to the step of initializing, displaying the image with a map of the non-disjoint pixel-clusters overlaid thereon, and, after the step of segmenting, displaying the image with a map of the categories overlaid thereon.

* * * * *

UNITED STATES PATENT AND TRADEMARK OFFICE
CERTIFICATE OF CORRECTION

PATENT NO. : 12,327,392 B2
APPLICATION NO. : 17/780279
DATED : June 10, 2025
INVENTOR(S) : Khalilian-Gourtani et al.

Page 1 of 1

It is certified that error appears in the above-identified patent and that said Letters Patent is hereby corrected as shown below:

In the Claims

Column 29, Line 27, in Claim 1, after "region," delete "N".

Column 29, Line 28, in Claim 1, delete "$N_{C(t)}$" and insert -- $N_{C(t)}$ --.

Column 29, Line 30, in Claim 1, delete "$n_{C(t)}^{(c)}$ (c," and insert -- $n_{C(t)}^{(c)}$ --.

Column 29, Line 31, in Claim 1, delete "$\upsilon_{(t)}^{(c)}$ (c)" and insert -- $\upsilon_{(t)}^{(c)}$ --.

Column 29, Line 33, in Claim 1, delete "$N_{C(t)} > 1$" and insert -- $N_{C(t)} > 1$ --.

Column 29, Line 33, in Claim 1, delete "$n_{C(t)}^{(c)}$" and insert -- $n_{C(t)}^{(c)}$ --.

Column 29, Line 35, in Claim 1, delete "$n_{C(t)}^{(c)} < T_{KC}$" and insert -- $n_{C(t)}^{(c)} < T_{KC}$ --.

Signed and Sealed this
Fourth Day of November, 2025

John A. Squires
*Director of the United States Patent and Trademark Office*